Figure 1:
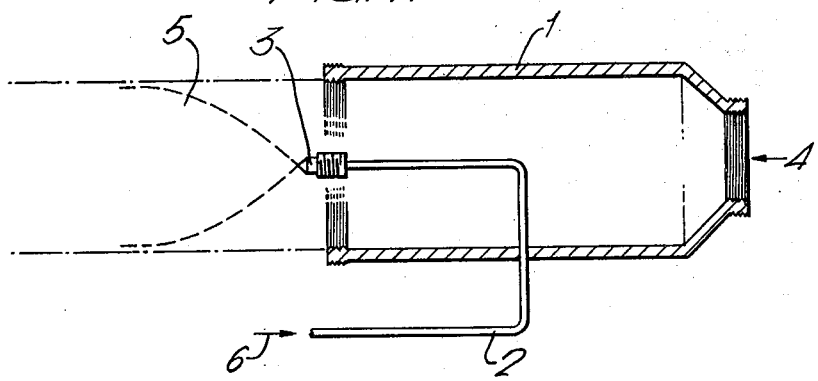

United States Patent [19]

Schmidt et al.

[11] 3,889,004

[45] June 10, 1975

[54] HIGH PRESSURE INJECTION OF A FATTY IN AQUEOUS PHASE

[75] Inventors: Heinrich Gottlieb Schmidt, Wedel, Holstein; Kunc Gustav Strauss, Hamburg; Josef Tennikat, Delmenhorst, all of Germany

[73] Assignee: Lever Brothers Company, New York, N.Y.

[22] Filed: Dec. 20, 1973

[21] Appl. No.: 427,004

Related U.S. Application Data

[63] Continuation of Ser. No. 292,192, Sept. 25, 1972, abandoned, which is a continuation-in-part of Ser. No. 129,776, March 3, 1971, abandoned.

[30] Foreign Application Priority Data

Mar. 24, 1971 Luxembourg.....................60639

[52] U.S. Cl. ............... 426/188; 426/189; 426/340; 252/359
[51] Int. Cl............................................. A23d 3/02
[58] Field of Search .......... 426/340, 339, 336, 194, 426/189, 188; 252/359, 308

[56] References Cited
UNITED STATES PATENTS

| 1,152,456 | 9/1915 | Vogelsang...................... 252/359 R |
| 1,475,574 | 11/1923 | Gesell................................. 426/340 |
| 1,540,592 | 6/1925 | Best..................................... 252/359 |
| 2,197,457 | 4/1940 | Werk et al.......................... 426/339 |
| 2,284,023 | 5/1942 | Scripture........................ 252/359 R |
| 2,605,185 | 7/1952 | Zachariassen et al. ............. 426/340 |
| 2,684,949 | 7/1954 | McMillan et al. ............... 252/359 D |

Primary Examiner—Norman Yudkoff
Assistant Examiner—M. Mullen
Attorney, Agent, or Firm—Lever Brothers Company

[57] ABSTRACT

A process for preparing emulsions, particularly edible emulsions, is described in which one liquid phase is injected into another liquid phase at a pressure difference of at least 100 atmospheres and with a pressure in the second liquid of at least 0.3 atmospheres. A wide range of emulsions can be obtained which are useful in the preparation of cheese, margarine, coffee-cream, drinking-milk and yoghurt.

13 Claims, 4 Drawing Figures

HIGH PRESSURE INJECTION OF A FATTY IN AQUEOUS PHASE

This is a continuation of application Ser. No. 292,192, filed Sept. 25, 1972, now abandoned, which is a continuation-in-part of Application Ser. No. 129,776, filed Mar. 31, 1971, now abandoned.

The invention relates to the preparation of emulsions, especially to the preparation of edible fatty emulsions and products made therefrom.

BACKGROUND AND PRIOR ART

Emulsions are of great importance commercially. A particularly important area is fatty emulsions in the food-industry. Examples of foods that are or are made from fatty emulsions are margarine, butter, cheese, milk, cream and yoghurt.

The generally accepted methods of making emulsions on an industrial scale are, for low-fat emulsions, (a) the use of a colloid mill, a homogenizer, in which an emulsion is produced by spinning a mixture of the liquid to be emulsified through ducts in a rotor revolving at high speed; (b) the use of ultrasonic vibrators on such a mixture of liquids; and (c) forcing such a mixture under high pressure through fine nozzles or a fine-meshed gauze; and, for high-fat emulsions, (d) churning-procedures.

All of these methods suffer from one or more disadvantages. In particular, they are of limited applicability. There has long been a need for a process that could be used to prepare emulsions of a wide range of types and desired stability. Preferably, for economic and bacteriological reasons, the process should involve the use of few, if any, moving parts.

INVENTION

It has been found that an aqueous fatty emulsion is obtained directly, very conveniently and with excellent properties if a first liquid is injected through a nozzle into a stream of a second liquid flowing at between about 2 and about 50 cms/sec per nozzle through and filling a pipe with a pressure difference between said first liquid and said second liquid immediately before injection of at least 100 atmospheres and a pressure in said second liquid of at least 0.3 atmospheres, said first and second liquids consisting essentially of a fatty and an aqueous phase.

The upper limit for the difference in pressure is not important but conveniently is 400 atmospheres or even 800 atmospheres if suitable equipment is available. The upper limit for the pressure in the second liquid is conveniently 80 atmospheres. None of these upper limits is to be understood as implying that no, or even a reduced, technical effect is obtained above this limit.

Indeed at least for the difference in pressure improved results in some respects are obtained the higher the pressure. But for practical reasons, such as availability of suitable equipment and the importance of safety precautions absurdly high pressures will of course not be used. It is to be understood that pressures named herein are in excess of atmospheric; e.g., 0.3 atmospheres means an absolute pressure of 1.3 atmospheres. The first liquid is injected into the second liquid and is therefore self-evidently at the higher pressure. It will be understood that although the first and second liquids must not be mutually fully soluble, they need not be entirely immiscible. At least the fruit liquid does not contain vapour or gas.

That the second liquid flows through and fills a pipe is particularly advantageous when the emulsion is detrimentally affected by contact with air, such as by oxidative decomposition or bacterial contamination. The pipe need not necessarily be of circular cross-section. The first liquid issuing from the nozzle forms a cone of droplets which gets dispersed in the second liquid. So as to minimize breakage of the emulsion, it is preferred if this cone does not impinge too sharply on an interface, either air/liquid boundary or, for instance, pipe wall. The shape of the cone depends on very many features, for instance the pressure difference, the viscosities of the fluids, the cross-sectional area and geometry of the nozzle opening, the angle of the nozzle to the stream of the second liquid and the internal geometry of the nozzle. Some idea of the cone to be expected can be obtained from chemical engineering handbooks and textbooks but simple experiment is the best method for checking whether process conditions with particular liquids and apparatus meet the above preferred requirement. One generalization can be made however: the length of the pipe after the injection point should preferably be at least 20 times the maximum diameter of the cone. If, as is preferred, the cone at its maximum diameter has a crosssection equal to that of the pipe, the length of the pipe should be at least 20 times the pipe's minimum dimension. When there is more than one injection point and these are arranged in series, preferably the length of pipe between them should similarly be at least 20 times the pipe's minimum dimension. Use of a pipe in which there is a large gap between the cone at its maximum diameter and the wall of the pipe is disadvantageous. The disadvantage is that it can lead to inefficient mixing of the cone and the second liquid and hence to non-uniform emulsions. A further consequence of the discovery that the cone at its maximum diameter should fill the pipe, is thus that pipes of elliptical and, particularly, circular cross-section are preferred. If the first liquid is injected against (countercurrent) the stream of the second liquid, the chance that the droplets coalesce is increased. Thus preferably the first liquid is injected in the same direction (co-current) as the stream of the second liquid.

The nozzle preferably has a circular opening but other shapes can be used. There is an approximate correlation between the size of the opening of the nozzle and the difference in pressure for a given size of droplet in the emulsion. Preferably the difference in pressure in atmospheres divided by the area of the opening of the nozzle in square millimetres should be between 500 and 5,000, particularly preferably about 2,000. The opening can be, for example, ring-shaped, i.e., with a concentric solid piece in the centre of the opening. If the opening is a simple circular opening (i.e., not blocked), then preferably it has a diameter in the range 0.3 to 1.2 mm, particularly about 0.4 mm. At a given diameter of the opening of the nozzle, constant temperatures of the first and second liquids, and a constant pressure difference, the content of the first liquid in tthe emulsion depends on the throughput of the second liquid, and the smaller the latter, the higher the content of the first liquid in the emulsion.

Advantageously a system comprising a multiplicity of nozzles can be used. For instance, the capacity of the process is increased. To control the droplet-size distribution in the emulsion, a multiplicity of nozzles connected in parallel or in series can be used under various operating conditions such as regards the size of the opening of the nozzle, the injection pressure, and the temperature of the injected liquid. A multiplicity of nozzles in series is preferred since higher concentrations of the first liquid can thereby be obtained.

Droplet size in the emulsion is one of the factors that determines the emulsification efficiency (as defined below) and can be 1–25 $\mu l \mu$(dia.) according to, for example, the diameter of the opening of the nozzle and the temperature and pressure of the first liquid when it is injected. The droplet size varies in approximately inverse ratio to the pressure and the temperature at a given diameter of the opening of the nozzle. The temperature of the second liquid also affects the emulsification efficiency but to a lesser extent.

The invention till now has been described in terms of fatty emulsions. The applicability of the process according to the invention to the preparation of other emulsions will be clear.

To prepare a fatty emulsion according to the invention the first and second liquids should consist essentially of a fatty and an aqueous phase. In other words, at least one of the first and second liquids must comprise a fat and at least one must comprise water. With this proviso, the first and second liquids can, separately, be an aqueous system, a fat, a water-in-oil emulsion or an oil-in-water emulsion.

As fat any edible synthetic or natural glyceride can be used either singly or in any combination. Examples include babasue kernel oil, cashewnut oil, castor oil, cocoabutter, coconut oil, cohume, cottonseed oil, grapeseed oil, groundnut oil, illipe, kapokseed oil, linseed oil, maize oil (cornoil), mowrah oil, mustardseed oil, nigerseed oil, olive oil, palm kernel oil, palm oil, poppyseed oil, rapeseed oil, zero-erucic rapeseed oil, rice bran oil, rubberseed oil, safflower oil, sesame seed oil, sheanut oil (kaute butter), soyabean oil, sunflowerseed oil, tall oil, teaseed oil, tung oil, wheat germ oil, fishliver oil, herring oil, menhaden oil, pilchard oil, sardine oil, sperm oil, whale oil, bird fat, bone grease, butter, ghee, lard, beef tallow and white hog grease. Nutritionally it is advantageous to include fats containing polyunsaturated fatty acids. Examples of such polyunsaturated fats are sunflower oil, safflower oil, cottonseed oil, wheat germ oil, soybean oil, grapeseed oil, poppy seed oil, tobacco seed oil, rye oil, walnut oil and corn oil.

In this specification the terms fat and oil are treated as synonyms.

Both the first and second liquids can contain suspended solids such as crystals of fat or waxes gut such crystals in the first liquid must not be such as to block injection. Simple raising of the temperature will ensure sufficient fat in the liquid state.

When such fatty emulsions are made by conventional methods such as homogenisation, there is a tendency for aggregation of the emulsion droplets to occur. Aggregation is much less likely to occur in the process of the invention; a more uniform emulsion is obtained.

Using one nozzle emulsions can be prepared directly containing up to 45 percent of the first liquid, although percentages greater than 35 percent can cause difficulty. This, although particularly applicable to fatty emulsions, is generally true. For emulsions containing more than 45 percent of first liquid, injection points (e.g., nozzles) in series are necessary.

As explained above the percentage of first liquid in the emulsion depends on the flow of the second liquid. The lower limit, particularly for a fatty emulsion, is preferably 2 cm/sec. or 50 l/hour. The upper limit is not very critical but is normally, per injection point (e.g., nozzle) in series, 50 cm/sec. or 700 l/hour.

The invention is particularly important for the preparation of milk-based fatty emulsions. These include emulsions in which the fat is non-milk and those in which it is derived from milk.

When conventional processes such as homogenisation are used with aqueous milk liquids, milk-protein, in particular casein, is often detrimentally affected. A general advantage of the process according to the invention is that this is significantly less likely to occur. However, the first liquid preferably does not comprise a milk product.

The invention includes a process for making a reconstituted milk by injecting butter fat into skimmed milk. One advantage is that the butter fat and the skimmed milk, preferably in powder form, can be stored much longer than the original milk. l/h, A process according to the invention can advantageously be arranged so that the emulsion is led directly into a pasteurizer. In such a system, i.e., when the emulsion is led directly to a pasteurizer, a pressure in the range 0.3 to 10 particularly about 1.5 atmospheres is automatically developed in the second liquid.

A wide range of milk liquids can be used in the process according to the invention. For instance, skimmed milk, butter milk or milk can be used or such products reconstituted or concentrated.

One important product that can be made from an emulsion prepared according to the invention is cheese. To give an emulsion suitable for cheese preparation, the first fluid should preferably comprise a fatty phase and the second fluid an aqueous phase. The emulsion should preferably contain from 2 to 10 percent fat.

Cheese in which the milk fat has been wholly or partially replaced by non-milk fat is sometimes known as filled cheese or margarine cheese. In the production of cheese of this type, a filled milk is first made as the starting material. By filled milk the skilled man understands milk, the milk fat content of which has been wholly or partially replaced by or supplemented with non-milk fat.

The invention as explained above can also be used to reconstitute a milk product using butter fat and the emulsions so obtained can be of course suitable for preparing cheese.

Skim milk is the preferred second liquid in the production according to the invention of an emulsion for cheese-making, but whole milk, condensed milk and milk reconstituted from concentrated milk and/or from dried skim milk and water can be used for this purpose.

The addition of up to 15% of buttermilk either to the emulsion or to the first or second liquid is particularly advantageous. The advantage is that it improves the consistency and taste of the cheese obtained. Instead of buttermilk, the equivalent quantity of butter milk powder can be used.

Emulsions made by prior art methods, see Background and Prior Art, usually give cheese that does not come up to required standards, and in particular has a defective consistency (e.g., it is crumbly, tends to oil-off and has a poor micro-structure), a defective taste (i.e., a bitter or sour taste or a non-cheesy taste) and a defective aroma or none at all. Another defect that is likely to occur is deterioration of the taste because the cheese turns rancid during the ripening process. This defect occurs particularly with semi-hard cheeses and hard cheeses.

One object of the present invention is to produce an emulsion suitable for the production of a cheese, in particular a semi-hard or hard cheese, which is of comparable quality to analogous cheeses made from conventional milk products.

Two advantages of the present invention for prepared an emulsion suitable for cheese preparation are that the emulsions obtained have the desired definite but slight tendency to cream and also a relatively high emulsification efficiency, so that they can be obtained, if desired, without the addition of an emulsifier. By adjusting the process of the invention the tendency to cream and the emulsion stability of emulsions made according to the invention can be made similar to those of fresh cow's milk for example. An emulsion particularly suitable for cheese-making has an emulsification efficiency in the range 15 to 30, particularly preferably 22.5 to 25.7.

An advantage particularly relevant to emulsions for cheese is that the milk protein is not impaired.

For preparation of an emulsion suitable for the preparation of cheese a fatty first liquid is used with a temperature preferably in the range 50°–90°C, particularly preferably 60°–80°C; a milk second liquid is used with a temperature preferably in the range 20°–60°C, particularly preferably 40°–45°C; and the pressure difference between the two liquids in preferably in the range 180–250 atm. As mentioned above, the first fluid can itself be an emulsion.

In a preferred process according to the invention for preparing an emulsion particularly suitable for cheese preparation, the first liquid is a fat-in-water emulsion with a fat content of, for example, 30 percent and the second liquid skimmed milk.

It is also possible to obtain suitable emulsions by first producing a cream-like emulsion with a fat content of, for example, 30 percent, by the process of the invention and then adjusting the fat content by adding skim milk.

All types of cheese such as fresh cheese, soft cheese, semi-hard cheese and hard cheese can be made using emulsions made by the process of the invention. Examples of fresh cheeses are cottage cheese are double-cream cheese. Camembert and Brie are examples of soft cheeses, while examples of semi-hard cheeses are Edam, Tilsit, Gouda and butter cheese. Hard cheeses include Emmentaler, Cheddar, Svecia and Herrgard cheese.

The problem of keepability is not as acute with fresh and soft cheeses as with hard and semi-hard cheeses, because they are intended for early consumption. In their production, a wide range of fats can therefore be used in emulsions for subsequent use in the cheese-making process. Even in the case of soft cheeses, however, there is already a noticeable improvement as regards consistency and oiling-off when fats with a slip melting points in the range 24°–37°C are used for the cheese-making milk and cream emulsions. With semi-hard and hard cheeses the effect is more pronounced. Use of a fat with a slip-melting point in the range 24°C to 37°C is therefore preferred. Fats with a slip-melting point in the range 28°C to 34°C are particularly preferred.

Special Fat for Cheese

As mentioned above it is nutritionally advantageous to include fats containing polyunsaturated fatty acids. This applies to cheese as well as to other fat-containing products.

It has been found that a cheese containing a vegetable fat with a slip-melting point in the range 24°C to 37°C and comprising an interesterified blend of a polyunsaturated fat and a high-melting fat is particularly acceptable both in processing and to the consumer.

Although use of such a fat is a preferred form of a process according to the main, first-stated invention, use of such a fat is not restricted to any particular method of preparing the emulsion.

The high-melting fat preferably has a slip-melting point in the range 50°C to 70°C, particularly preferably 58°C to 63°C. Conveniently a mixture of such a blend and a polyunsaturated fat can be used. The interesterified blend preferably contains from 25 to 60% of polyunsaturated fatty acids based on total fatty acids.

Table III gives examples of interesterified blends. Table VI gives examples of fats some of which can be prepared from these blends and all of which are illustrative of preferred fats. The percentage of high-melting fat in the mixture before interesterification is preferably below 10.

The dilatation values of preferred fats (e.g., interesterified blends or their mixtures with polyunsaturated fats) are as follows:

| Preferred | Particularly preferred |
|---|---|
| at 0°C: 50–400 | 100–250 |
| at 10°C: 40–350 | 50–200 |
| at 20°C: 25–220 | 30–150 |
| at 30°C: 10–135 | 15–100 |
| at 40°C: 2–50 | 5–40 |

Dilatations described in this specification are determined by the method described in Boekenoogen: "Analysis and Characterization of Oils, Fats and Fat Products," 1964, Interscience Publishers, London, pp. 143–145.

Slip-melting point is defined in Bailey "Melting and Solidification of Fats," Interscience Publishers Inc., New York. 1950, p. 110.

Examples of suitable polyunsaturated fats are mentioned above. l/h high-melting fats are stearines and hydrogenated fats. An example of a suitable hydrogenation method is the use of a fresh precipitated nickel or kieselguhr catalyst at a temperature from 150–180°C and a pressure from atmospheric to 5 atmospheres.

After the above description of a cheese containing a special fat, a return is now made to a description of preferred forms of the main invention.

Cheese processes developed for normal cheese, i.e., cheese made from milk, can be used on emulsions prepared according to the invention. If need be, reference can be made to such standard works as J. G. Davis, "Cheese," 1965. But it has been found to be advantageous, particularly when the fat is very sensitive to oxidation and/or anti-oxidants are absent, to carry out some or all of the steps of the cheese-making process in an atmosphere of a protective gas. Nitrogen and argon are examples of suitable gases.

One main aspect of the invention in which emulsions particularly suitable for preparation of cheese is described above. A second main aspect of the invention is the preparation of emulsions particularly suitable for the preparation of margarine.

For the preparation of an emulsion particularly suitable for margarine preparation, preferably either the first or second liquid comprises and aqueous phase with a pH in the range 2.0 to 7.0, preferably 4.2 to 5.0. The liquid comprising the aqueous phase preferably is at a temperature in the range 0°C to 45°C. The pressure difference is preferably in the range 200 to 350 atmospheres. Conventional margarines are water-in-fat emulsions containing about 80% of fat. Low-calorie spreads, herein considered as margarines, can contain as little as 40% of fat.

For the preparation of emulsions particularly suitable for margarine production, the invention provides, amongst others, the following methods:

a. Injection of a fatty first liquid into an aqueous second liquid using one or more than one parallel nozzle. Fat-in-water emulsions with a fat content upto 45% can thereby be obtained. Margarines can be prepared directly and, if the margarine is convention, any excess water kneaded out. Alternatively, before the conversion to margarine, the water-content can be lowered using a separator.

b. Stepwise injection of a fatty first liquid using more than one nozzle arranged in series. Emulsions containing up to 85% of fat can thereby be obtained. Upto 80% the emulsions obtained are oil-in-water but above 80% there is some doubt and some water-in-oil emulsion may be present. The emulsions can be converted into margarines if necessary by removal of excess water as outlined under (a).

c. Injection of an aqueous first liquid in a fatty second liquid. By suitable processing margarines, for example, of the type described in Belgian patent specification 724,864 can thereby be obtained.

d. Injection of a cream-like aqueous first liquid into a fatty second liquid.

In the usual methods for preparing margarines, an aqueous and a fat phase are mixed and then homogenized. Finally the homogenized oil-in-water emulsion is converted to margarine by mechanical working in cooling and crystallisation apparatus.

The consistency of margarines prepared by cooling, working and crystallising an emulsion of margarine fat and an aqueous phase depends on the solids content of the fat phase at different temperatures. The solids content can be calculated from the dilatation values, as described in "The Journal of the American Oil Chemists' Society," Volume 31 (1954), pages 98–103.

A wrapper margarine should have a fat composition of a $D_{20}$ of at least 350. Preferably such a margarine should have a $D_{15}$–$D_{25}$ of at least 200, in order to obtain a sufficiently cool taste. A tub margarine should have a $D_{20}$ of at least 100, preferably at least 180. As such tub margarines, because of their high liquid fat content, should generally be stored in refrigerators and therefore consumed at low temperatures, no specific requirements are set for the difference between the dilatation values at 15° and 25°C. It can even be advantageous to prepare margarine fats for tub margarines with a low $D_{15}$–$D_{25}$, so that the margarine has an almost constant consistency over a wide temperature range, making it easily spreadable both at room and at refrigerator temperature. Both the wrapper and the tub margarine should have a dilatation value of not more than 150 at 35°C. and preferably not more than 100 at that temperature, in order to arrive at good eating qualities, i.e., thin and quick melting on the tongue. (By $D_t$ is meant herein the dilatation value at $t$°C.). For a liquid margarine $D_{20}$ should preferably be 50–130; and the margarine should be pourable at 5°C. and stable at 25°C.

The aqueous phase of a margarine can contain, for example, water, salt, potassium sorbate, flavour, ground soybeans, or milk in the form of whole milk, cream, skim milk, or reconstituted skim milk.

Some suitable compositions for the aqueous phase of margarines are set forth in the following table.

|  | Range[a] | 1. | 2. | 3. | 4. | 5. | 6. |
|---|---|---|---|---|---|---|---|
| Salt | 0–4 | 1.75 | 1.0 | 4.0 | 1.75 | — | 2.0 |
| Skim milk | 0–19.7 | — | 18.8 | — | — | — | 9.0 |
| Skim milk solids | 0–2 | 1.63 | — | — | — | 1.80 | — |
| Water (tap and/or distilled) | 0–19.7 | 16.30 | — | 15.77 | 16.30 | 17.87 | 9.0 |
| K-sorbate | 0–0.1 | 0.10 | — | — | 0.10 | 0.10 | 0–0.01 |
| Flavour | 0–0.03 | 0.03 | — | 0.03 | 0.03 | 0.03 | 0–0.03 |
| Ground soybeans | 0–2 | — | — | — | 1.63 | — | — |
| EDTA[b] | 0–75ppm | — | — | 75ppm | — | — | — |

[a] to a total of 19.7 to 20 parts
[b] disodium calcium ethylenediaminetetraacetate An advantage of the present invention is that emulsions obtained containing about 80% of fat are less viscous than such emulsions prepared by conventional methods.

The preparation of the emulsion occurs in apparatus with many moving parts which causes problems. Particularly normally it requires the addition of emulsifiers. Emulsifiers can lead to unwanted properties, especially taste, in the margarine. The process of the invention does not require complicated apparatus and enables, if wished, emulsifiers to be left out or used in reduced quantities. A reason for the use of an aqueous milk phase in margarine, is that the proteins in the milk help to stabilize the emulsion. One advantage of the present invention is that emulsions of improved stability are obtained with a non-milk aqueous phase.

One aspect of the invention is an emulsion prepared by the process and particularly suitable for margarine production. Another is a margarine prepared from such an emulsion.

A third main aspect of the invention is the preparation of coffee creams and drinking-milks. Conventionally milk is separated into skimmed milk and cream, which cream can be used as coffee-cream after appropriate processing. So as to obtain a narrow range of droplet size with consequent good stability, such coffee-creams are normally homogenized at least twice. Such homogenization affects the milk protein disadvantageously which, it is suspected, leads to a grey colour when the coffee-cream is added to coffee. Such homogenization is also costly and leads to products with unfavourably low viscosity.

The present invention enables emulsions to be prepared suitable for use as coffee-cream by use of a concentrated cream or fat as the first liquid and a fat-free or low-fat milk as the second liquid, such as skimmed milk or butter milk. Preferably the concentrated cream contains 25 to 70% of fat.

When fat is used as the first liquid, the solids content of the second liquid has preferably been increased by, for example, evaporation.

The temperature of the second liquid is preferably in the range 10°C to 80°C, particularly preferably 40°C to 50°C. The temperature of the first liquid is preferably in the range from 20°C to 80°C. The pressure difference is preferably in the range 150 to 300 atmospheres when the first liquid is a concentrated cream. The pressure difference when the first liquid is fat is preferably 200 to 300 atmospheres, particularly preferably 250 atmospheres. The pressure in the second liquid is preferably in the range 1 to 3 atmospheres. The pressure difference is higher generally than for cheese-emulsions so as to reduce creaming.

Coffee-creams prepared according to the invention have a comparatively high viscosity and also give coffee the desired deep colour. The stability, because of narrow droplet-size distribution, is also good. The fat content is preferably in the range 5 to 30 percent, particularly preferably 8 to 20 percent.

One aspect of the invention is a coffee-cream prepared according to a process according to the invention.

When the coffee-cream has a fat content of up to 30, preferably 10 percent, a stable milk drink can readily be obtained by simple mixing of the cream with a fat-free or low fat content milk such as skimmed milk. Alternatively such a milk drink can be obtained directly by a process according to the invention in which case the second, aqueous milk fluid is not preferably concentrated and an appropriately lower amount of fat or cream is injected.

An emulsion particularly suitable for a drinking-milk has preferably an emulsification efficiency greater than 26 and particularly preferably above 30.

The drinking-milk preferably has a fat content in the range 0.5 to 10 percent. One aspect of the invention is such a drinking-milk prepared according to the invention. The coffee-creams and drinking milks are obtained in a simple manner and do not require homogenisation or necessarily sterilisation. Sensitive fats, such as polyunsaturated fats, can be affected by sterilisation when emulsified. When the first fluid comprises fat, it will be sterile because of prior steam treatment.

In a preferred aspect, particularly with polyunsaturated fats, aqueous and fatty phases are used that have been prior sterilized. The advantage is that the fat is not sterilised in an emulsion.

The coffee-cream are preferably immediately cooled and packaged, preferably aseptically.

Particularly when butter-milk is used, either partly or completely, as the second fluid or when butter-milk powder is added, the process enables coffee-cream or milk drinks to be obtained without the use of non-milk stabilizers, such as emulsifiers or salts.

Instead of a coffee-cream a low-calorie coffee-whitener can be made containing about 1% of fat. For instance, higher flow rates could be used than for preparing a coffee-cream. The product has a higher non-fat milk-solids content than a drinking milk. In general, coffee-creams, drinking milks, coffee-whiteners and emulsions for yoghurt can be prepared using the same conditions with sufficient change (for instance in flow rate) to give the appropriate fat content.

It will be understood that flavours and other ingredients can be added to or incorporated in the products of the invention.

In both the above description and in the following illustrative examples, all percentages are by weight unless otherwise stated.

EXAMPLE 1

A fat for the preparation of an emulsion suitable for making Svecia cheese was made as follows:

Equal quantities by weight of de-slimed, neutralised and bleached sunflowerseed oil and hardened rapeseed oil (melting point: 60°C) were mixed at about 90°C in a tank fitted with a stirrer and dried under vacuum for 1 h at 130°C. After drying to a residual water content of 0.03%, 0.25% of $CH_3ONa$ was added and the mixture was interesterified for 30 min. at 130°C, with stirring to give an interesterified blend. After being washed three times until the discharged washing water had a pH value of 7, the interesterified blend was dried under vacuum for 30 min. at 130°C. It was then bleached for 30 min. at 110°C with 2.5% of Fuller's earth and subsequently filtered in a frame filter press. The blend had a slip point of 52°C.

Ninety-one parts by weight of sunflowerseed oil were mixed with 9 parts by weight of the blend. The slip point of the resulting fat was 34°C This fat was neutralised with 0.8 N NaOH and washed three times until the discharged washing water had a pH value of 7. It was then dried under vacuum for half an hour at 130°C, cooled to 110°C, and bleached at this temperature with 2.5% of Fuller's earth for 30 min. The fat was then filtered in a frame filter press. 100 kg was deodorised for 6 h at 180°C with steam (4.5 kg/h at 3–4 mm Hg). The refined fat obtained had an acid value of 0.06, an iodine value of 127 and a linoleic acid content of about 55% on the total fatty acids.

9.3 kg of the refined fat as obtained above was injected at 70°C and a pressure difference of 250 atm. through a nozzle with a circular opening of diameter 0.376 mm into a 68 l of skimmed milk at 45°C flowing at 100 l/h through and completely filling a pipe of diameter 50 mm and length greater than 180 cms. The pressure in the skimmed milk was 1.5 atmospheres. The direction of injection was the same as that of the stream of the skimmed milk. The emulsion obtained had a fat content of 12.0%. This was diluted with 213 litres of skimmed milk; 291 litres of emulsion with a fat content of 3.1% were obtained.

This 3.1% fat emulsion was acidulated at 31°C with 0.8% of a starter culture, and 60 ml of liquid rennet (rennet strength: 1:10,000) were added about 30 min. later at an acidity degree of 7.8 SH. After coagulation for a further 30 min. the coagulum obtained was cut into cubes and processed into Svecia cheese in the normal way. During the process it was noted that the cheese curd could be processed into a very firm cheese, i.e., it was easy to separate off the whey, and when squeezed in the hand the curd had "body." The curd particles hardly differed from those made from ordinary milk.

After ripening for 8 weeks in film at 13°C and a relative humidity of 80%, the cheese had a good consistency and a pleasant mild taste without any flavour defects.

Analysis of the cheese gave the following values:

| | |
|---|---|
| Dry matter: | 61.7% |
| Fat in dry matter: | 48.8% |
| pH: | 5.3 |
| NaCl content: | 1.8% |

EXAMPLE 2

From an emulsion prepared exactly as described in Example 1 a Svecia cheese was produced. The process used was that described in Example 1 except that the curd was produced and salted in a nitrogen atmosphere. The curd was pressed in a cheese press for about 18 h at a pressure of 40 kg per 10.5 dm². It was then removed from the moulds and placed in tags made of polyamide-polyethylene film, the bags being finally evacuated and sealed by welding.

The cheese was ripened at 13°C. After ripening for 8 weeks, the cheese had a good consistency and a pleasant mild taste without any flavour defects. In contrast to Example 1 where the young cheese had a slightly rancid taste, the young cheese from Example 2 (and the later Examples of cheeses prepared at least partially under nitrogen) had a mild taste.

Analysis of the cheese gave the following values:

| | |
|---|---|
| Dry matter: | 58.1% |
| Fat in dry matter: | 45.7% |
| pH: | 5.4 |
| NaCl content: | 1.8% |

EXAMPLE 3

A milk-like emulsion was prepared as described in Example 1 except that the interesterification blend consisted not of equal parts of sunflowerseed oil and hardened rapeseed oil but of six parts of sunflower seed oil and four parts of hardened rapeseed oil with a melting point of 60°C. The interesterified blend had a slip point of 45°C. Seventy-five parts by weight of sunflowerseed oil were mixed with 25 parts by weight of the interesterified blend. The slip point of the fat obtained was 33.5°C, its dilatation values being as follows:

| | |
|---|---|
| at 0°C: | 105 |
| at 10°C: | 57 |
| at 20°C: | 31 |
| at 30°C: | 17 |
| at 40°C: | 7 |

A Svecia cheese was made from the emulsion obtained. The process used was that described in Example 2, except that only half the quantity of salt was used. The curd was pressed in a cheese press for about 18 h at a pressure of about 40 kg per 10.5 dm². It was then removed from the moulds and placed for 24 hours in a decocted salt bath under nitrogen. The cheese loaves removed from the salt bath were dried in a nitrogen atmosphere and placed in bags made of plastic film, which were then evacuated and sealed by welding.

The cheese was ripened at 13°C. After ripening for 8 weeks, the cheese had a good consistency and a pleasant mild taste without any flavour defects.

Analysis of the cheese gave the following values:

| | |
|---|---|
| Dry matter: | 59.4% |
| Fat in dry matter: | 46.7% |
| pH: | 5.5 |
| NaCl content: | 2.0% |

EXAMPLE 4

A milk-like emulsion prepared exactly as described in Example 1 was acidulated at 31°C with 0.7% of a souring culture, and 60 ml of liquid rennet (rennet strength 1:10,000) were added about 35 min. later at an acidity degree of 7.8 SH. After coagulation for a further 40 min. the coagulum was cut into cubes and processed into Tilsit cheese in the known way. The partially salted curd was kept in cheese moulds for about 20 h to undergo consolidation under its own weight. The cheese was then removed from the moulds and placed in a scoured salt bath for about 40h. The cheese loaves removed from the salt bath were left to dry for 2 days, then smeared with a suspension of *Brevibacterium linens* and placed for further ripening in a ripening room having a temperature of 15°C and a relative humidity of 90–95%, the cheese being smeared every day with a suspension of *Brevibacterium linens*. After four weeks' ripening the Tilsit cheese made in this way had the same smell, taste and consistency as ordinary Tilsit.

Analysis of the cheese gave the following values:

| | |
|---|---|
| Dry matter: | 57.8% |
| Fat in dry matter: | 48.2% |
| pH: | 5.5 |
| NaCl content: | 1.7% |

EXAMPLE 5

A milk-like emulsion prepared as in Example 3 was acidulated with 0.8% of a starter culture at 32°C. 13 ml per 100 l of milk of a mould culture (*Penicillium camemberti*) were then added. After 35 min, 20 ml per 100 l of milk of liquid rennet were introduced (rennet strength: 10,000) at an acidity degree of 7.8 SH. After coagulation for a further 30 min, the coagulum was cut into cubes, and the cubes were allowed to stand until the supernatant whey had an acidity degree of 5.8 SH. The curd was then filled into Camembert moulds, turned (together with the moulds) three times at intervals of 1, 3 and 5 h after moulding, and then allowed to stand for 20 h.

The Camembert cheese obtained was then removed from the moulds and placed for about 70 min. in a decocted salt bath which had been inoculated with a yeast (*Torulopsis candida*) and *Previbacterium linens*. The cheese was removed from the salt bath, placed in a ripening room (after a draining time of 4 h), and left to ripen for 9 days at a temperature of 17°C and a relative humidity of 80–90%. The cheese was then packed and stored for a further period at 15°C. Organoleptic examination, carried out 15, 21 and 28 days after the cheese was prepared, revealed practically no difference from conventional Camembert in smell, taste, consistency or appearance.

Analysis of the cheese gave the following values:

| | |
|---|---|
| Dry matter: | 51.0% |
| Fat in dry matter: | 50.6% |
| NaCl content: | 2.5% |

EXAMPLE 6

A cream-like emulsion with a fat content of 9.8% was prepared from 90 l of skim milk and 10 kg of a fat prepared as described in Example 3.

The conditions used were similar to those given in Example 106:

| | |
|---|---|
| Pressure difference: | 200 atm. |
| Pressure in skimmed milk: | 1.5 atm. |
| Fat temperature: | 70°C |
| Skimmed milk temperature: | 45°C |
| Diameter of nozzle opening: | 0.376 mm |
| Flow rate of skimmed milk: | 530 l/h |

The emulsion obtained was inoculated at 44°C with 5% of a yoghurt culture. After a souring time of about 200 min, the degree of acidity was 28–29 SH. The acid emulsion was then heated under nitrogen to 65°C in 1 hour, with constant stirring, and then cooled immediately to 15°C. The finely mixed coagulum was ladled into bags. Draining the whey took about 20 h at a temperature of about 13°C. 0.9% of salt was added to the resulting double-cream fresh cheese with a dry-matter content of about 45%, and the cheese was tested organoleptically. It was found to be practically indistinguishable from ordinary double-cream fresh cheese as regards taste, smell, consistency and appearance.

| | |
|---|---|
| Dry matter: | 45.1% |
| Fat in dry matter: | 71.2% |
| pH: | 4.4 |
| NaCl content: | 0.9% |

Excellent organoleptic findings were obtained when seasonings such as paprika, onions, chives, herbs etc. were mixed with the double-cream fresh cheese made in this way.

EXAMPLE 7

A fat was prepared as follows: 88.6 kg of maize germ oil (acid value: 0.14, saponification value: 191.8, and iodine value: 126) was mixed at about 90°C in a tank fitted with a stirrer with 11.4 kg of a high-melting fat, i.e. sunflowerseed oil hardened to a melting point of 69°C. The mixture was dried under vacuum for 1 h at 130°C, 0.2% of CH₃ONa was added and the mixture was interesterified for 1 h at 110°C, with stirring to obtain an interesterified blend. After washing several times until the discharged washing water had a pH value of 6.5, the blend was again dried under vacuum for 1 h at 110°C, then bleached with 2.5% of Fuller's earth for 30 min. at 110°C and finally filtered in a frame filter press. 97 kg of the filtrate were deodorised for 6 h at 180°C with steam (4.5 kg/h at 4–6 mm Hg). The blend obtained in this way had a neutral taste, a slip point of 28.5°C, an acid value of 0.12, a saponification value of 191.1 and an iodine value of 107.8.

A milk-like emulsion with a fat content of 6.0% was made from 130 l of skim milk and 8.3 kg of the interesterified blend obtained above by the injection method using the procedure of Example 1 except that the flow rate of skimmed milk was 530 l/h. The 6.0% fat emulsion was then diluted with 112 l skimmed milk to give a 3.0% fat emulsion.

The 3.0% fat emulsion was acidulated at 30°C with 0.8% of an approved culture, and 50 ml of liquid rennet (rennet strength 1:10,000) were mixed in about 30 min. later at an acidity degree of 7.8 SH. About 40 min. after the rennet had been added the coagulum was cut and processed into Herrgard cheese in the conventional way. During production it was found to be very easy to make the curd into cheese, i.e., the whey separated off easily and the curd had "body" when pressed in the hand. The curd particles were practically identical to those made from ordinary milk.

Ten weeks after it had been produced the cheese had a springy and at the same time firm body and a typical, mild taste.

Analysis of the cheese gave the following values:

| | |
|---|---|
| Dry matter: | 58.5% |
| Fat: | 28.5% |
| pH: | 5.45 |
| NaCl content: | 1.9% |

EXAMPLE 8

A 12% fat emulsion was first prepared as described in Example 1 but using the interesterified blend described in Example 3. To this emulsion was added 15 l of fresh sweet-cream buttermilk and 198 litres of skimmed milk to give a final emulsion.

Svecia cheese was made from this final emulsion by the method given in Example 3.

After ripening for eight weeks the cheese had a good, springy consistency and a marked, milk cheese taste.

Analysis of the cheese gave the following values:

| | |
|---|---|
| Dry matter: | 58.4% |
| Fat in dry matter: | 46.5% |
| pH: | 5.5 |
| NaCl content: | 1.8% |

EXAMPLE 9

A milk-like emulsion was prepared continuously and in an enclosed system as follows:

1200 l of milk at a rate of 550 l/h, was degatted at 45°C. Into the skimmed milk obtained and still at 45°C flowing through a pipe of diameter 50 mm was injected a fat of the composition given in Table I at 70°C and a pressure difference of 250 atmospheres. The length of the pipe after the injection point (nozzle) was at least 180 cms. The diameter of the circular opening of the nozzle through which the fat was injected was 0.376 mm. The emulsion obtained was led directly into a pasteuriser which produced a pressure in the skimmed milk of 1.5 atmospheres. The emulsion was pasteurised at 72°–74°C.

The pasteurised emulsion obtained had a fat content of 11% which was adjusted to 9.8% by the addition of pasteurised skimmed milk to give the milk-like emulsion.

A cream cheese was prepared from the emulsion as follows.

The emulsion was pumped into a ripening-vessel and 5% of yoghurt-culture was added. Ripening occurred at 43°C. The ripened product was pasteurised at 80°C and concentrated at about 78°C to a mass containing 45% solids.

The cream cheese obtained had a pleasant, fresh taste, was easily spreadable and was stable for at least 8 weeks at 5°C.

Samples to which flavouring materials, such as onion, paprika, sausage, had been added also showed excellent properties.

EXAMPLE 10

A milk-like emulsion was prepared as described in Example 9, except that another fat was used (see Table I). The emulsion obtained had a fat content of 10.5%. By the addition of pasteurised skimmed milk the fat content was adjusted to 10%.

A cream cheese was prepared as described in Example 9. The cheese had as excellent properties as that of Example 9.

EXAMPLES 11 to 18

500 l of milk were stored at 8° to 10°C for 20 h and then decreamed at 45°C by passing through a separator at a rate of 700 l/h. The skimmed milk obtained was passed through a pipe of 50 mm diameter into which was set a nozzle with a circular opening of diameter 0.376 mm. The pipe was over 1 metre long. The nozzle was set in the centre of the pipe and directed in the same direction as the stream of skimmed milk.

Fat was heated under nitrogen to 70°C before injection and then injected at a pressure difference of 250 atmospheres. The pressure in the skimmed milk was 1.5 atmospheres. This pressure was produced because the emulsion formed was led directly into a pasteuriser. The emulsion was pasteurised at 72°–74°C. The filled milk obtained had a fat content of 7%. This was adjusted with pasteurised skimmed milk to 3.1% to give a final milk-like emulsion.

Examples 11–15, 17 and 18 differed from each other only in the fat (first fluid) injected through the nozzle. Table I gives the composition of the fat used in each Example. Example 16 also differed in that 40 l (10%) of butter milk was added continuously to the skimmed milk immediately before the fat was injected.

400 l of the final milk-like emulsion were warmed to 31°C and 80 g $CaCl_2$, 80 g $KNO_3$, 80 ml cheese colourant and 3.2 l of appropriate culture were added. After 30 min. at an acid degree of 7.6 to 7.8 SH 120 ml of a rennet solution (rennet strength 1:10,000) were added. After 30 min. the jelly-like mass obtained was cut into cubes. The whey exuded had an acid degree of 4.9–5.0 SH.

Treatment and moulding of curd

The mixture of curd and whey obtained was set in motion in the cheese vat with a stirrer, then comminuted to the size of barleycorns and stirred at 31°C for 30 minutes ("pre-cheesed"). For a further 30 minutes the mixture of curd and whey was heated again ("burned") from 31°C to 41°C. During the re-heating the degree of acidity rose from approximately 4.9 to 5.3–5.5 SH. Then about 120 (about one-third of the total quantiry) of whey was drawn off and 40 l of water having a temperature of 41°C was added. The degree of acidity was now about 4.6 to 4.8 SH. Thereafter stirring was again carried out for 40 minutes ("post-cheesed"). Then the grains of curd were allowed to settle and the mixture of whey and water was drawn off entirely. The curd was then mixed with 4 kg (1%, based on the finished cheese*) of kitchen salt and filled into cheese moulds.

*A yield of 1 kg of cheese is estimated from 10 l of kettled milk.

Pressing

The curd in the moulds was pressed for about 40 kg/10.5 $dm^2$ at 20 hours under a pressure of about 40 kg//22°–24°C. After the first hour the cheese in the mould was turned.

Salt bath treatment

After being pressed, the cheese was removed from the moulds and placed in a 20% solution of kitchen salt of 14°C for 24 hours.

Ripening

After the salt bath treatment the filled Svecia was stored in a ripening chamber at 13°C and a relative humidity of 80%. To prevent the development of mould, after it had been stored for 7 days the cheese was immersed in ethyl alcohol denatured with methyl alcohol. During the ripening the filled Svecia was turned every two days.

Preparation of comparison cheeses from normal milk (Comparison C)

At 45°C, 450 l of raw milk having a fat content of 3.4% was partly decreamed to a fat content of 3.1% and pasteurized (temperature 72°–74°C, for 40 seconds). 400 of this milk was placed in a cheese vat and tempered at 31°C. The further working was carried out in the same way as for the filled Svecia. In general, adequate filled Svecia (with skin) was obtained. The cheese from Example 17 tended to exude oil and tasted slightly rancid. Example 18 showed, in contrast, excellent properties. The cheese from Example 16 in contrast to Example 13 was less crumbly.

EXAMPLES 19 to 27

Milk-like emulsions were prepared as described in Examples 11 to 18 with the changes noted below and in Table II. The addition of sweet cream buttermilk (Examples 22, 23 and 24) was reduced to 5% (based on the skim milk mixture).

In Example 27 milk partly decreamed to a fat content of 0.4% was used instead of the skim milk.

Coagulation and preparation of curd

Coagulation and preparation of curd followed as described in Examples 11 to 18.

Treatment of curd, salting and moulding

For Examples 19, 20, 21 and 22 treatment of curd, partial salting and moulding under air were then carried out as described in Examples 11 to 18.

In Example 23 the treatment of curd, salting and moulding was done under nitrogen. The mixture of curd and whey (about 400 kg) was set in motion in the cheese vat with a stirrer and comminuted to the size of barleycorns. Then the stirring device was placed on the cheese vat, a tent was set up over the cheese vat and by continuously supplying nitrogen a nitrogen atmosphere was created in the tent. Stirring was then carried out at 31°C for about 30 minutes ("pre-cheesed"). For a further 30 minutes the mixture of curd and whey was heated again from 31°C to 41°C ("burned"). Then about one-third of the total amount of whey was drawn off and water of 41°C was added in an amount equal to 10% of the amount of milk used. Then stirring was carried out again for 40 minutes ("post-cheesed"). Thereafter the curd was allowed to settle and the mixture of whey and water was removed entirely. The treatment with $N_2$ gas was then stopped. The curd was mixed with 2% of kitchen salt (based on the finished cheese: 1 kg from 10 l of milk) and filled into cheese moulds. After the pressing, these cheeses were removed from the moulds and, without a salt bath treatment, packed under vacuum in polyethylene bags. In Examples 24, 25, 26 and 27 treatment of curd was done under nitrogen but the partial salting of the curd and the moulding of the curd under air. The treatment of curd up to the settling of the curd and the removal of the mixture of whey and water was carried out under nitrogen, as described above for Example 23. Thereafter the tent was removed the curd was mixed with 1% of kitchen salt (based on the finished cheese) and filled into moulds.

Pressing

Pressing of all the cheeses was carried out at 20°C under a pressure of about 40 kg/10.5 dm² for about 20 hours. After the first hour of pressing the cheese was turned in the cheese mould.

Salt bath treatment

After the pressing, the cheese prepared according to all Examples except Example 23 were removed from the moulds and placed in a 20% solution of kitchen salt of 14°C for about 24 hours.

Packing and ripening

The cheeses which had been salted only as curd (Example 23) were packed in plastic bags directly after the pressing. The other cheeses which had been partially salted as curd were packed in plastic bags directly after the salt bath treatment. The bags were evacuated, heat-sealed and stored in a ripening chamber at 13°–16°C. During the ripening all the cheeses were turned every two days. The duration of the ripening differed according to the ripening temperature and was between 4 and 8 weeks (Table III). At the end of this time the cheese was aged at 8°C. At this temperature further ripening was greatly retarded.

Flavour

Although adequate cheeses were obtained from all Examples, when the curd had been prepared in the presence of air, it (the curd) tasted rancid. Whether the taste was slight or distinct varied directly with the content of linoleic acid in the fat used (Table II, Examples 19–22). This rancidity could also be observed in the fresh cheese obtained; in cheeses with a content of linoleic acid of 50% it did not disappear during the ripening (Table II, Examples 19, 21 and 22) while with a cheese having a content of linoleic acid of 25% it could no longer be observed after 8 weeks. On the other hand, if the filled milk was made into cheese, salted and moulded under nitrogen, the curd was not rancid (Table II, Example 23). The cheese from Example 23 also dit not taste rancid. However, after ripening for 2 weeks a fairly strong smell and taste developed (Table II, Example 23) which could be prevented if the curd was prepared under nitrogen but the partial salting and filling into moulds was carried out under air (Table II, Examples 24, 25, 26 and 27). Ripe cheese prepared in this way had a pure, mild cheese flavour. When cheeses with a content of linoleic acid of 50% were cut a distinct rancid taste (Examples 24 and 25) was soon observed, which dit not appear when the content of linoleic acid was about 25%.

By the addition on retention (Example 27) of 0.4% milk fat (butter fat) a slightly flaccid taste in the milk-like emulsions was concentrated. Cheese from Example 27 showed immediately on preparation a somewhat fuller taste than cheeses from Example 26 which differed only in the absence of 0.4% milk fat.

Consistency

All milk-like emulsions could be made into Svecia cheese as described above. The consistency of the cheeses of Examples 24 and 25 was adequate. When the ripening of such a cheese is carried out in foil, the good consistency properties are retained and, furthermore, attack by mould, drying out and rancidity caused by oxidation are prevented. The consistency of the cheese of Example 20 was slightly too firm, somewhat crumbly and not very spreadable, and the consistency of the cheese of Example 22 was greasy. Cheeses with a high content of poly-unsaturated fatty acids (Examples 19, 21, 24 and 25) were somewhat too soft; cheeses made with added buttermilk were far too soft (Examples 22, 23 and 24). But it should be noted that a sample of cheese prepared similarly from milk was also somewhat too soft.

EXAMPLES 28, 29 and 30

100 l of raw milk was decreamed at about 45°C in a heating device with a throughput of 500 l/h. Into the decreamed milk (skimmed milk) a fat was continuously injected. The conditions used were similar to those used in Example 1:

| | |
|---|---|
| Pressure difference: | 250 atm. |
| Pressure in skimmed milk: | 1.5 atm. |
| Fat temperature: | 70°C |
| Skimmed milk temperature: | 45°C |
| Diameter of nozzle opening: | 0.376 mm |
| Pipe diameter: | 50 mm |

Pasteurisation was effected at 72°–74°C. To 28.0 kg of the emulsion thus obtained, having a fat content of about 10.5%, about 3.6 l of pasteurised skimmed milk was added in order to adjust the fat content to 9.5%. Examples 28, 29 and 30 differed only in the fats used. The fat of Example 28 was the same as that of Example 10 (Table I) and the fat of Example 30 was the same as that of Example 9 (Table I). The fat of Example 29 was a liquid oil of triglycerides of $C_8$ (70%) and $C_{10}$ (30%) fatty acids. 30 l of the 9.5% milk-like emulsion was cooled to 41°–43°C and inoculated with 3 l (10%) of yoghurt culture. After an acidification time of about 150 min. curd was formed. The degree of acidity was then between 33–36 SH.

Under continuous stirring the curd was heated for 1 hour to 65°C and then immediately cooled to 15°C. The finely stirred and cooled curd was ladled into bags, two bags lying on top of each other being loaded each time with a weight of 20 kg. The exudation of the whey lasted about 20 hours at a temperature of about 13°C. "Double cream fresh cheese" (Doppelrahmfrischkase) was obtained.

3.5 kg of the cheese, which had a dry solids content of about 45%, was then salted with 25 g (0.7%) of salt. Comparisons A, B and C were prepared as follows:

Comparison A

"Double cream fresh cheese" from normal milk 25 l of raw milk with a fat content of 3.4% was pasteurised (temperature 72°–74°C for 40 sec.) and mixed with 7.0 kg of pasteurised milk cream (fat content 30%) to a fat content of 9.5%. This 9.5% milk was heated to 41°C and inoculated with 3.2 kg (10% based on the amount of milk) of yoghurt culture. The further working was carried out as described above.

Comparisons B and C 3.0 kg of freshly refined maize germ oil was mixed with 7.0 kg of skim milk. The mixture was heated to 65°C and homogenised at 100 atmospheres to give a 30% cream. comparisons B and C differ from each other in that Comparison C the 30% cream was treated with lipase.

Milk like emulsions were then prepared by mixing the creams with skim milk in the proportions 10 kg of cream to 21.6 l of skim milk. The cheese preparation followed the routes described for Examples 28, 29 and 30. All the 30% creams from Comparison B tasted strongly oily and of maize. This was less for creams from Comparison C but still occurred.

The milk-like emulsions obtained according to Example 28, 29 and 30 were good with respect to flavour.

"Double cream fresh cheeses" from Examples 28, 28 and 30 were good with respect to flavour.

"Double cream fresh cheese" from Comparison C tasted purely acidic.

"Double cream fresh cheeses" from Comparison B tasted strongly seedy.

All the "double cream fresh cheeses" from Examples 28, 29 and 30 had an adequate consistency. After storage for three months at 5°C no exudation of oil or whey could be observed.

EXAMPLE 31

Example 7 was repeated except that the fat was maize germ oil. The cheese obtained, although adequate, had a somewhat crumbly texture after 10 weeks' storage.

EXAMPLES 32–77

These Examples illustrate a wide range of processing conditions applicable in the invention. Also illustrated are emulsions formed in the process according to the invention.

An 8 mm high pressure pipe 2 with an interchangeable nozzle 3 is set in the middle of a pipe 1 of diameter 50 mm (FIG. 1). By means of a high-pressure pump a first liquid 6, for example fat, is injected through the nozzzle into a stream of second liquid 4 flowing through the pipe 1.

As shown in FIG. 1 the first liquid is injected in the same direction as the flow of the second liquid. The general shape of the cone 5 formed by droplets of the first liquid in the second liquid before the droplets are evenly dispersed is also shown.

As mentioned, the direction of injection can be counter to the flow of the second liquid and can be at an angle to it.

1. When the second liquid is based on milk and the first liquid is fatty preferred constructions are as follows: In an enclosed system the milk, which has been pre-heated and then decreamed in a separator, passes the injection point continuously, is there supplied with fat and then comes into a heating installation to be pasteurised. As cream can also be injected it is possible, in order to obtain special emulsion properties, for the cream separated in the separator to be continuously injected back into the milk. Cream from another source can also be used.

Injection in the direction of the flow of second liquid

Maize germ oil (first liquid) heated to 70°C was injected under a pressure of 200 atmospheres into a stream of skim milk (second liquid) which in the various tests was flowing at a speed of 700, 600, 500, 400, 300, 200 and 100 l/h. Nozzles with openings of $d_1 = 0.400$, 0.376 and 0.314 mm diameter were tested (Table IV, Examples 32–51).

Injection counter-current to the flow of second liquid

Maize germ oil heated to 70°C was injectd into the skim milk in counter-current under a pressure of 200 atmospheres and at a speed, in the various tests, of 700, 600, 500, 400, 300, 200 and 100 l/h. Nozzles with openings of $d_1 = 0.400$, 0.376 and 0.314 mm diameter were tested (Table IV, Examples 52–63).

Study of emulsification

In order to study the emulsification a nozzle of $d_1 = 0.376$ mm was used. The hourly capacity of the heating installation was in each case about 600 l. Injection was in all cases carried out in co-current. Maize germ oil served as the first liquid. When the tests were under way, samples of emulsions were drawn, examined with respect to the fat content and, for further examination, adjusted to a fat content of about 3.5% by addition of skim milk.

Variation of the oil temperature

Maize germ oil at 100°, 90°, 80°, 70°, 60°, 50° and 40°C was injected under a pressure of 250 atmospheres into skim milk at 45°C (Table V, Examples (64–70).

Variation of the injection pressure (pressure difference)

Maize germ oil at 70°C was injected under a pressure of 50, 100, 150, 200, and 250 atmospheres into skimmed milk at 45°C (Table V, Examples 67, 71, 72, 73 and 74).

Changing the temperature of the skim milk

Maize germ oil at 70°C was injected under a pressure of 200 atmospheres into skim milk at 20°C (Table V, Example 75).

Addition of an emulsifier to the fat 50 g (0.5% based on the fat) of lysocetinol was suspended in about 500 ml of skim milk at 70°C and mixed with 10 kg of vegetable fat. The mixture was heated to 70°C and injected under a pressure of 200 atmospheres into skim milk at 45°C (Table V, Example 76).

Injection into the skim milk of a vegetable fat cream with a fat content of 30%.

6 kg of vegetable fat was mixed with 14 l of skim milk, heated to 65°C and was homogenized at 100 atmospheres in a Gann-Emulgor. The emulsion obtained was heated to 70°C and injected into skim milk at 45°C under a pressure of 200 atmospheres (Table V, Example 77).

Pressure in second liquid

In all of Examples 32–77 the pressure in the second liquid was 2 atm. As is intended throughout this specification the pressure was measured near the injection point.

Results

Figure 2:
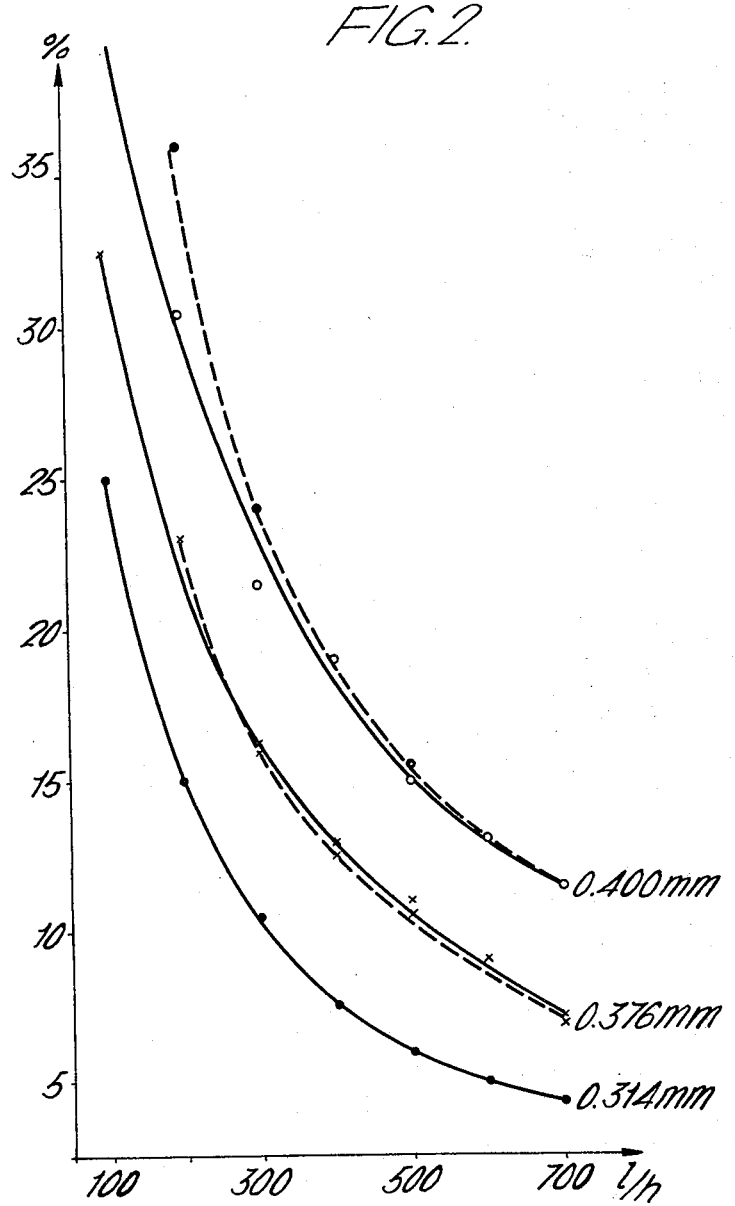

At a given $d_1$ of the nozzle, a constant injection pressure and a constant temperature of fat and milk, the fat content of the emulsion was dependent upon the speed of flow of the milk (Table IV; FIG. 2). With decreasing speed of flow of the milk the number of fat droplets increased. At a flow speed of the milk of 100 l/h, a nozzle with an opening of diameter $d_1 = 0.376$ mm, an injection pressure of 200 atmospheres, an injection temperature of 70°C and a milk temperature of 45°C, a cream was obtained with a fat content of 32.5%. This vegetable fat cream resembled a milk fat cream but differed greatly from the picture of the cream obtained by homogenization.

Figure 3:
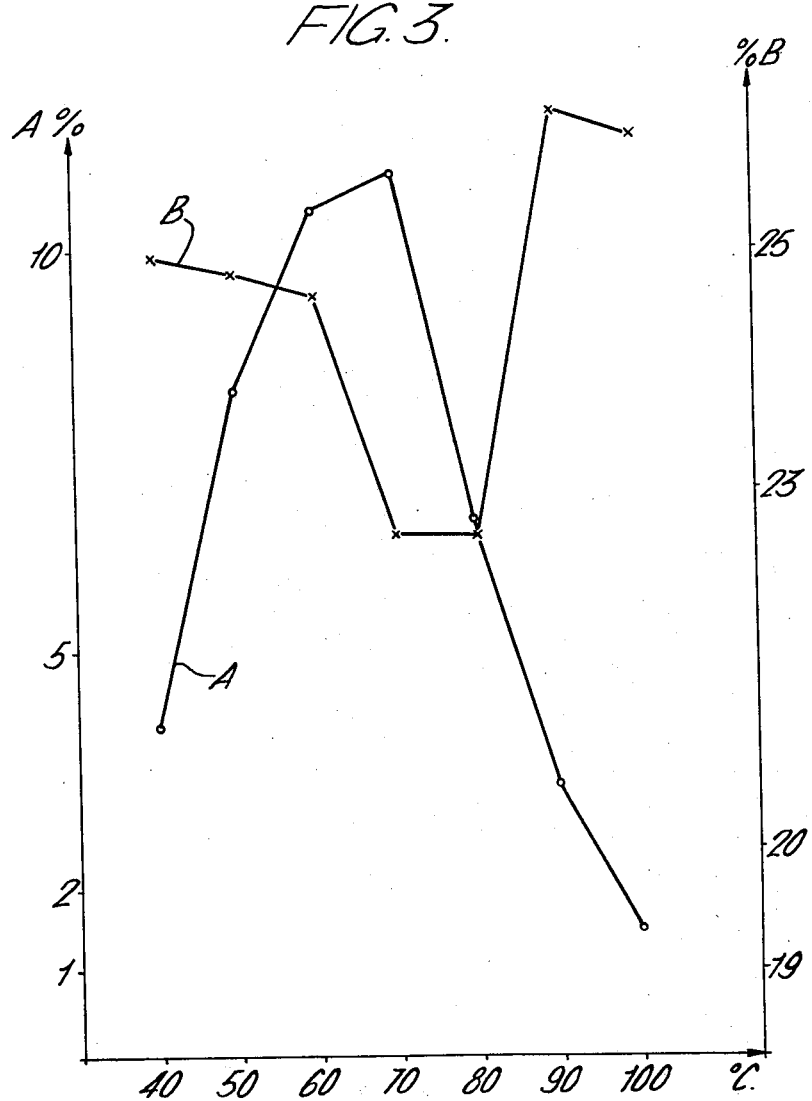

The properties of the emulsions were influenced by the temperature of the injected oil. The lowest tendency to cream and the greatest emulsification efficiency were shown by emulsions prepared when the temperature of the oil during injection was between 60 and 80°C (FIG. 3; Table V, Examples 66, 67 and 68). In FIG. 3, A is the emulsification efficiency and B the creaming). At an oil temperature of 70°C (Table V, Example 37) the creaming was 9 times slighter than and the emulsification efficiency almost twice as great as that that of cow's milk. That the injection temperature of the oil had an influence on the size and distribution of the fat droplets was also established. As the injection temperature decreased from 80° to 40°C, the fat droplets became larger. The distribution of fat droplets at 40°, 90° and 100°C, in comparison with that at 70°C, was uneven. After curdling of the emulsions differences to be seen in the firmness of the curd and the cloudness of the whey were not so great (Table V, Example 64–70).

Figure 4:
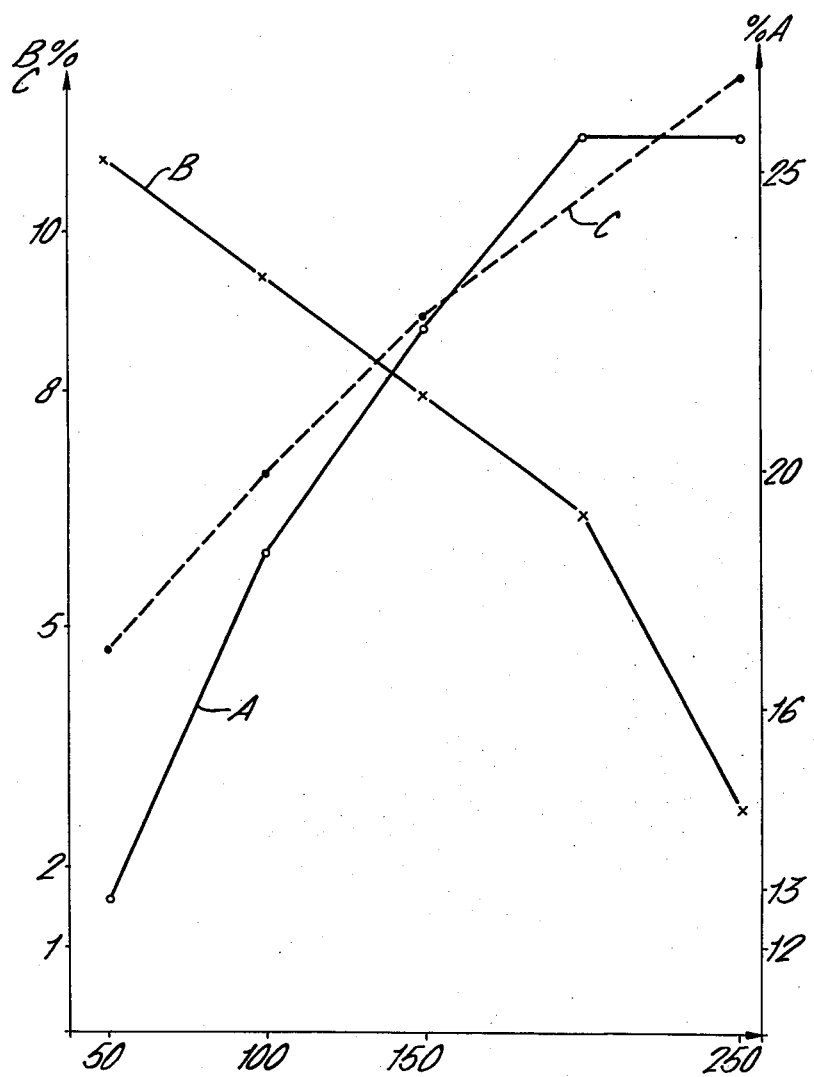

At an increasing fat injection pressure in the range of from 50 to 250 atmospheres the emulsification efficiency rose; the creaming of the filled milk became less (Table V, Examples 67, 71, 72, 73 and 74; FIG. 4). (FIG. 4 gives results at various pressure in atmospheres for emulsification efficiency, A; creaming, B, of 3.5% emulsion; and fat content, C, of emulsion obtained). At an increasing injection pressure the fat content of the emulsion also rose (Table V, Examples 71, 72, 73 and 74; FIG. 4). In the range 50 to 250 atmospheres and at increasing injection pressure, an increasing number of fat globules appeared; at a pressure of 250 atmospheres there was practically nothing else but fat globules. The distribution of droplets was uniform in all these cases.

By lowering the temperature of the skim milk from 45° to 20°C an emulsion was obtained with a higher tendency to cream and a considerably lower emulsification efficiency (Table V, Example 75). The fat droplets were larger than at a milk temperature of 45°C and to some extent had a tendency to agglomerate. The firmness of the curd was normal, the cloudness of the whey compared with the curdled normal milk was somewhat too slight.

Emulsions to which emulsifiers had been added showed less tendency to cream and a higher emulsification efficiency than emulsions prepared without emulsifier. The fat droplets were just as uniformly dispersed as without emulsifier and somewhat smaller than with cow's milk. (Injection conditions in both cases: pressure: 200 atmospheres; fat temperature: 70°C; milk temperature: 45°C; nozzle: $d_1$=0.376 mm.) After the curdling of the emulsion prepared in this way the firmness of the curd and the cloudiness of the whey were the same as those of the cow's milk (Table V, Example 76).

By injecting an emulsion with a fat content of 30% into skimmed milk an emulsion with a very slight tendency to cream and a high emulsification efficiency was obtained. Significantly smaller fat droplets were obtained than with cow's milk. The distribution of the fat droplets was uniform. After curdling the firmness of the curd was the same as that of cow's milk, the cloudiness of the whey was somewhat less (Table V, Example 77).

Discussion

The continuous preparation of emulsions in an enclosed system according to the injection method described offered special advantages: through variation of various parameter, such as pressure, temperature, speed of flow, geometry of the nozzle, etc., the properties and the fat content of the emulsions prepared could be influenced.

Emulsions with a slight tendency to cream and a high emulsification efficiency can be obtained according to the process according to the invention.

The simple construction, easy operation and the continuous procedure of the installation makes the use of the process of the invention advantageously simple. By varying the diameter of the pipe the process can be adapted to, for example, the performance of heating installations of various sizes.

The figures for creaming as given in Table V were determined as follows:

100 ml of the emulsion were stood in a 200 ml burette at 32°C for one hour. The fat content in the bottom 75 ml was measured and also the fat content in the top 25 ml.

The figures for emulsification efficiency were determined as described below under Comparison D.

EXAMPLE 78

In an injection device consisting of a pipe 4 m long and having a diameter of 50 mm, in one end of which a nozzle connected to a high-pressure line was centrally fixed, an oil-in-water emulsion was prepared, by injecting a fat composition into skimmed milk flowing through the pipe. The composition of the fat is given in Table I. The direction of injection was the same as that of the stream of skimmed milk. The conditions used were similar to those given in Example 1:

| | |
|---|---|
| Pressure difference | 200 atm. |
| Pressure in second liquid | 0.3 atm. |
| Temperature of first liquid | 70°C |
| Temperature of second liquid | 45°C |
| Diameter of opening of nozzle | 0.400 mm |
| Flow rate of second liquid | 500 l/h |

The emulsion obtained had a fat content of 23%. By further concentration in the milk separator at a temperature of 45°C the fat content of the emulsion was increased to 64%. The emulsion thus obtained was viscous and a sample of it showed no phase separation after having been stored for 2 days at 70°C.

The concentrated emulsion was converted by phase-inversion in conventional apparatus to a margarine. With respect to its properties, particularly the spreadability and the melting behaviour in the mouth, it resembled similar products prepared by conventional methods.

EXAMPLE 79

The same procedure was followed as in Example 78, except for the following differences:

An aqueous phase consisting of 20% of tap water and 80% of skim milk was used instead of skimmed milk.

| | |
|---|---|
| Temperature of the aqueous phase | 39°C |
| Temperature of the fatty phase | 80°C |
| Injection pressure | 80 atm. |
| Fat content of the emulsion obtained by injection | 6.9% |
| Fat content of the emulsion after concentration | 71.0% |
| Flow rate of second liquid | 1000 l/h |

The properties of the margarine thus prepared were practically the same as those of the margarine obtained according to Example 78.

EXAMPLE 80

The same procedure was followed as in Example 78, except that refined milk fat was used as the fatty phase

| | |
|---|---|
| Temperature of the skimmed milk: (second liquid) | 45°C |
| Flow rate of the second liquid: | 900 l/h |
| Temperature of the fatty phase: | 71°C |
| Fat content of the emulsion obtained by injection: | 12% |
| Fat content of the emulsion after concentration: | 64% |

Here too a product was obtained with the spreading and melting behaviour of margarine.

EXAMPLE 81

In the injection device described in Example 78, a water-in-oil emulsion was prepared, by injecting water into a fat composition flowing through the pipe. The fat had the same composition as that used in Example 78.

| | |
|---|---|
| Temperature of the water: | 68°C |
| Temperature of the fat: | 50°C |

-Continued

| | |
|---|---|
| Flow rate of the fatty phase: | 500 l/h |
| Pressure difference: | 250–300 atm. |
| Pressure in second liquid: | 0.5 atm. |

The emulsion obtained had a fat content of 83.4%.

EXAMPLE 82

The same procedure was followed as in Example 81, except for the following differences:

| | |
|---|---|
| Composition of the aqueous phase: skim milk : water | = 50:50 |
| Temperature of the aqueous, first liquid: | 7°C |
| Temperature of the fat, second liquid: | 49°C |
| Pressure difference: | 200 atm. |
| Pressure in second liquid: | 0.8 atm. |

The emulsion obtained had a fat content of 80%.

EXAMPLE 83

In the injection device described in Example 78 the fat composition of Example 78 was injected into flowing sweet cream buttermilk through three nozzles in series, each spaced 1 meter apart.

| | |
|---|---|
| Working conditions: | |
| Diameter of openings of the nozzles: | $d_1 = 0.8$ mm |
| | $d_2 = 0.6$ mm |
| | $d_3 = 0.4$ mm |
| Temperature of the sweet cream buttermilk (first liquid): | 22°C |
| Temperature of the fat (second liquid): | 50°C |
| Pressure difference: | 100 atm. |
| Pressure in second liquid: | 0.3 atm. |
| Flow rate of the sweet cream buttermilk: | 100 l/h |

The emulsion obtained had a fat content of 60%.

EXAMPLE 84

The same procedure was followed as in Example 83, except that water was used instead of sweet cream buttermilk.

| | |
|---|---|
| Temperature of the water (first liquid): | 3°C |
| Temperature of the fat (second liquid): | 50°C |
| Flow rate of the water: | 100 l/h |
| Pressure difference: | 180 atm. |
| Pressure in second liquid: | 0.5 atm. |
| Diameters of the openings of the nozzles: | $d_1 = 0.8$ mm |
| | $d_2 = 0.6$ mm |
| | $d_3 = 0.4$ mm |

The emulsion obtained had a fat content of 71%.

EXAMPLE 85

First an oil-in-water emulsion was prepared by injecting refined butter fat into a mixture (50:50) of skimmed milk and water. The fat content of the emulsion obtained was 7%.

| | |
|---|---|
| Flow rate of the second liquid: | 1000 l/h |
| Temperature of the aqueous phase (second liquid): | 0°C |
| Temperature of the fatty phase (first liquid): | 59°C |
| Pressure difference: | 260 atm. |
| Pressure in second liquid: | 0.5 atm. |

The 7% oil-in-water emulsion obtained was then injected according to the invention into butter fat.

| | |
|---|---|
| Temperature of the oil-in-water emulsion (first liquid): | 7°C |
| Temperature of the butter fat (second liquid): | 45°C |
| Flow rate of the butter fat: | 450 l/h |
| Pressure difference: | 180 atm. |
| Pressure in second liquid: | 0.3 atm. |

The emulsion obtained had a fat content of 67%.

EXAMPLE 86

The same procedure was followed as in Example 84, except for the following differences:
Composition of the aqueous phase: 50% culture + 50% water. Additives: 0.6% of kitchen salt; 0.1% of sorbic acid. The aqueous phase was acidified with citric acid to a pH value of 4.7.

Temperature of the aqueous phase: 0°C
Flow rate of the aqueous phase: 100 l/h

Additives to the fat: 0.25% of monoglyceride; 0.1% of cetinol; 45 mg of carotene per kg of oil; 0.8% of aroma cocktail

| | |
|---|---|
| Temperature of the fat: | 46°C |
| Pressure difference: | 250 atm. |
| Pressure in second liquid: | 0.5 atm. |

The emulsion obtained had a fat content of 78%. The emulsions described in Examples 81–86 were worked up to margarines in a conventional manner. Products were obtained having the spreading and melting behaviour of margarine.

Comparison D

Coffee cream with a fat content of 10% was produced by separating the skim milk from the milk, homogenised in the homogeniser at about 55°C and 250 atm. and then sterlised for 10 minutes at 120°C.

| | |
|---|---|
| Test results: | |
| Colour in the coffee: | light grey tint (Was determined by each time adding 6 ml of cream to 120 ml of standard coffee.) |
| Viscosity: | 4.08 cp |
| Emulsification efficiency: | 60.4% |

(A sample of cream of about 25 ml was centrifuged for 5 min. at 2,800 r.p.m. in a Christ-Becher centrifuge. The lower phase was thereafter removed and its fat content examined: $E = B/A \cdot 100$
$E$ = emulsification efficiency
$A$ = fat content of the starting sample
$B$ = fat content in the lower phase of the sample treated.)

Comparison E

Coffee cream with a fat content of 10% was homogenised at about 55°C first at 250 atm. and then at 50 atm. and thereafter sterilised for 10 minutes at 120°C. as in Comparison D.
Test results:
Colour in the coffee: light grey tint
Viscosity: 2.75 cp
Emulsification efficiency: 70.6%

Comparison F

Coffee cream with a fat content of 10% was homogenised at 55°C, first at 250 atm. and then at 150 atm. and thereafter sterilised for 10 minutes at 120°C. as in Comparison D.
Test results:
Colour in the coffee: light grey tint
Viscosity: 2.67 cp
Emulsification efficiency: 68.5%

EXAMPLE 87

Into skimmed milk flowing through a pipe of 50 mm diameter and length 3 meters cream with a fat content of 43% was injected

| | |
|---|---|
| Temperature of skimmed milk (second liquid): | 45°C |
| Temperature of cream (first liquid): | 55°C |
| Pressure difference: | 250 atm. |
| Pressure in second liquid: | 0.4 atm. |
| Nozzle diameter (opening): | 0.400 mm |

A coffee cream was obtained with a fat content of 10%. It was then sterilised for 20 minutes at 120°C.
Test results:
Colour in the coffee: deeper than the colour in Comparisons D to F and Example 88
Viscosity: 4.3 cp
Emulsification efficiency: 72.0%
The fat droplets had a narrow size distribution and were evenly dispersed.

EXAMPLES 89a and 89b

An emulsion was prepared by injecting a monoglyceride derived from a mixture of $C_8$ and $C_{10}$ fatty acids into tap water (89a) and distilled water (89b) using the installation outlined in Example 1.

| | |
|---|---|
| The injection conditions were | |
| Flow rate of the water (second liquid) | 500 l/h |
| Pressure difference | 250 atm. |
| Pressure in second liquid | 0.3 atm. |
| Diameter of opening of nozzle | 0.4 mm |
| Temperature of second liquid | 40°C |
| Temperature of monoglyceride (first liquid) | 60°C |

The emulsions obtained had the following viscosities at 25°C. As will be seen they showed thixotropic properties.

| | Shear rate (sec $^{-1}$) | Viscosity (cp) |
|---|---|---|
| Example 89a | 63.5 | 183 |
| | 127 | 102 |
| | 190 | 75 |
| | 380 | 47.5 |
| Example 89b | 63.5 | 293.5 |
| | 127 | 171.5 |
| | 190 | 129.8 |
| | 380 | 75.6 |

EXAMPLE 90
Preparation of emulsion

Composition of the aqueous phase:
  25% of bacterially acidified skim milk
  25% of tap water
  50% of skimmed milk
Additives:
  2.4% of NaCl (based on the aqueous phase)
  0.4% of sorbic acid (based on the aqueous phase)
Fatty phase used: The same as Example 10 (Table I)
Additives:
  0.3% of monoglyceride
  20 mg of carotene per kg of fat
Temperature of the aqueous phase (second liquid): 19°C
Temperature of the fatty phase (first liquid): 41°C
Application of three nozzles inserted in series in an injection pipe of length 4 metres. Seperation of nozzles was 1 metre. $d_1 = 0.4$ mm; $d_2 = 0.5$ mm; $d_3 = 0.6$ mm
Flow rate of the aqueous phase: 125 l/h
Pressure difference: 290 atm.
Pressure in second liquid: 0.5 atm.

A margarine was prepared from the emulsion (fat content 77%). The margarine obtained was excellent.

EXAMPLE 91

The same procedure was followed as in Example 90, except for the following differences:
Preparation of emulsion:
  Composition of the aqueous phase:
    50% of bacterially acidified skimmed milk
    50% of skimmed milk
Additives as in Example 90.
Composition of the fatty phase: As Example 10 (Table I) plus 9% sunflower seed oil
Temperature of the aqueous phase: 14°C
Temperature of the fatty phase: 36°C
Flow rate of the aqueous phase: 100 l/h
Pressure difference: 300 atm.

A margarine was prepared that was good but somewhat softer than the margarine obtained in Example 90. The fat content of the emulsion was 77%. Pressure in second liquid 0.8 atm.

EXAMPLE 92

The same procedure was followed as in Example 90, except for the following differences:
Preparation of emulsion
A water-in-oil emulsion was prepared by injecting an aqueous phase into a fatty phase.
Composition of the aqueous phase, and additives as in EXample 90.
Composition of the fatty phase: as Example 10 (Table I) plus 12% sunflower seed oil; additives as in Example 90.

| Diametre of pipe: | 50 mm |
| --- | --- |
| Length of pipe: | 3 metres |
| Diameter of nozzle opening: | 0.400 mm |
| Pressure in second liquid: | 0.4 atm. |
| Temperature of the aqueous phase: | 16°C |
| Temperature of the fatty phase: | 32°C |
| Flow rate of the fatty phase: | 450 l/h |
| Pressure difference: | 100 atm |

A margarine obtained in this manner was somewhat soft. The emulsion had a fat content of 78%.

EXAMPLE 93

The same procedure was followed as in Example 90, except for the following differences:
Preparation of emulsion:
  Composition of the aqueous phase: skimmed milk plus 10% of bacterially acidified skimmed milk.
Additives as in Example 90
Composition of the fatty phase: sunflower seed oil + 10% of butter fat
Additives:
  0.1% of cetinol
  0.7% of monoglyceride
  40 mg of carotene per kg of fat
Diametre of nozzle opening: 0.4 mm
Temperature of the aqueous phase: 10°C Pressure in second liquid 0.3 atm.
Temperature of the fatty phase: 34°C
Flow rate of the oil phase: 600 l/h
Pressure difference 150 atm An excellent liquid margarine was obtained from the emulsion obtained.

EXAMPLE 94

A coffee cream was prepared by injecting a fat (Table I) into a sweet cream buttermilk concentrated to a dry solids content of 21.6% and sterilised at a temperature of 125°C for 40 seconds. The fatty phase was injected at a temperature of 60°C and under a pressure of 280 atm into the milk which had a temperature of 50°C and was flowing through the installation described in Example 1 at a rate of 700 l/h. The pressure in the second liquid (the buttermilk) was 0.5 atm.

| The product had the following properties: | |
| --- | --- |
| Fat content: | 10.4% |
| Viscosity: | 23.1 cP. |

Colour in the coffee: comparable with that of 10% condensed milk
Organoleptic properties: smell like that of normal heated milk, a full, harmonious flavour.

The emulsion stored under sterile conditions remained unchanged during a storage time of at least 8 weeks at 5°C.

EXAMPLE 95

The same procedure was followed as in Example 94, except that another fat composition (see Example 19 Table II) was used and the dry solids content of the concentrated sweet cream buttermilk was 19%.

| The product had the following properties: | |
| --- | --- |
| Fat content: | 11.6% |
| Viscosity: | 22.6 cP. |

Colour in the coffee: comparable with that of 10% condensed milk
Organoleptic properties: smell like that of normal heated milk, a full, harmonious flavour.

The emulsion stored under sterile conditions remained unchanged during a storage time of at least 8 weeks at 5°C.

EXAMPLE 96

The same procedure was followed as in Example 95, except that a skimmed milk concentrated to a dry solids content of 21.7% was used instead of sweet cream buttermilk.

The product had the following properties:
Fat content: 11.2%
Viscosity: 24.6 cP.

Colour in the coffee: comparable with that of 10% condensed milk
Organoleptic properties: smell like that of normal heated milk, adequate flavour like that of condensed milk.
The emulsion stored under sterile conditions remained unchanged during a storage time of at least 1 week at 5°C.

EXAMPLE 97

The coffee-cream-like emulsion prepared according to Example 94 was stirred into skimmed milk in a ratio of 1:3.7.

The drinking milk obtained had a fat content of 2.8 and had a flavour like that of normal milk.

EXAMPLE 98

The same procedure was followed as that in Example 95, except that the fatty phase was injected into a sweet cream buttermilk that had been concentrated to a dry solids content of 20.2% and that was flowing through the installation at a rate of 500 l/h.

The product had the following properties:
Fat content: 18%
Viscosity: 19.8 cP.

Colour in the coffee: somewhat lighter than that of 10% condensed milk
Organoleptic properties: smell like that of normal heated milk, a full, harmonious flavour.

EXAMPLE 99

For the production of Gouda cheese a fat composition was first prepared as follows: 35 kg of completely refined maize germ oil (acid value 0.72, saponification value 192, iodine value 125) was interesterified under the same conditions as in Example 7 with 15 kg of palm oil that had been hardened to a melting point of 58°C. As in that Example, the blend was washed, dried and bleached. The slip point of the interesterified blend was 42°C.

From 42 kg of the interesterified blend and 75 kg of refined maize germ oil a composition was prepared which was deodorised for 5 hours in a steam apparatus at 180°C with 4.5 kg of steam per hour at 1–2 mm Hg. The refined fat obtained had a neutral taste and a slip point of 32°C.

From 7.6 kg of the freshly refined fat composition and 72.4 l of skimmed milk an emulsion with 9.5% of fat was then prepared by injection using the installation used in Example 1 (diameter of nozzle opening 0.376 mm; pressure difference 200 atmospheres; fat temperature 70°C; flow rate of the second liquid (the skimmed milk) 550 l/h; temperature of the skimmed milk 40°C; pressure in the second liquid 2 atm). After diluting this emulsion with abut 170 l of decreamed milk, 250 l of a milk-like emulsion with a fat content of 3.0% was obtained. At a temperature of 32°C this emulsion was acidulated with 0.6% of a starter culture and, about 30 minutes later curdled with 60 ml of liquid rennet (rennet strength 1:10,000) at an acidity degree of 7.3 SH. After a further curdling and thickening time of 30 min. the curd was cut into cubes and processed into Gouda cheese in the conventional way.

One of the two cheeses prepared in this Example was packed under vacuum in foil which was closed by heat-sealing. The other cheese was ripened for comparison without foil but under conditions which were otherwise the same.

After ripening for 8 weeks at 15°C and a relative humidity of 80% both cheeses had a typical, pleasant Gouda aroma which in the case of the cheese ripened in the rind was even somewhat more pronounced. Also, the consistency of this cheese was somewhat firmer than that of the cheese ripened in the foil. However, both cheeses had a springy consistency typical of Gouda and the typical hole-formation.

Analysis of the cheese gave the following values:

|  | Cheese ripened in the foil | Cheese ripened in the rind |
| --- | --- | --- |
| Dry matter | 57.9% | 62.1% |
| Fat in dry matter | 46.8% | 46.7% |
| pH | 5.73 | 5.72 |
| NaCl content | 1.8% | 1.9% |

EXAMPLE 100

From 159 kg of skim milk with a dry solids content of 11.5%, obtained by concentration of normal skim milk in a falling stream evaporator ("Fallstromverdampfer"), and 4 kg of maize germ oil a milk-like emulsion was prepared in the same way as in Example 1:
Primary emulsion with 12% fat from 4 kg of maize germ oil and 29.4 kg of skimmed milk concentrate
Pressure in the skimmed milk concentrate (second liquid): 2.5 atm. Adjustment to a fat content of 2.5% by diluting with about 126 kg of skim milk concentrate.

In a tank fitted with a stirrer and having a double jacket which can be heated, the milk-like emulsion was heated to 90°C and kept at this temperature for 10 min. After cooling to 60°C, 4.8 kg of sugar and 0.6 kg of gelatin were added, and then stirring was continued at this temperature for 20 min. After cooling to 43°C, inoculation with 8 kg of yoghurt culture was carried out.

The inoculated milk was allowed to ripen until a pH value of 4.2 was reached. Thereafter the curd was very finely stirred, pumped through a diaphragm valve to render the structure smooth, and then cooled to 25°C in plate heat-exchangers.

The diaphragm valve was closed to obtain optimum smoothness.

The yoghurt which had been cooled to 25°C was poured into polystyrene beakers which were then heat-sealed. The sealed beakers were then subjected to a heat treatment in an air tunnel. (Heating to 64°C within 45 min., maintained at a temperature of 64°C for 60 min., cooled to 8°C within 150 min.).

In order to prepare a fruit dessert yoghurt (cherries), beakers were filled ith 87.5 kg. of the above-mentioned yoghurt and 12.5 kg of cherry fruit concentrate at 25°C. After the beakers had been sealed the heat treatment described above was carried out. Keepable products with a good yoghurt taste and a typical smooth consistency were obtained. The pH value was 4.05 ± 0.05.

The preparation of the yoghurt was carried out within the following procedure and product limits:
Fat content up to 10%, preferably 0.5–3.5%
Fat-free dry matter of milk: 7–15%, preferably 9–12%
All the other product characteristics are not critical as far as the compatibility of the injected fat in yoghurt is concerned.

The data apply equally to yoghurt ripened in beakers and to stirred yoghurt.

EXAMPLE 101

The same procedure was followed as in Example 90, except for the following differences:
Preparation of emulsion
The emulsion was cooled between the 2nd and 3rd nozzle with the aid of a double-walled tubular cooler (length 1 m).
   Composition of the fatty phase: As Example 10 (Table I) plus 6% sunflower seed oil. Additions as in Example 80.
   Temperature of the aqueous second liquid: 13°C
   Temperature of the fat, first liquid: 32°C
   Flow rate of the aqueous, second liquid: 100 l/h
   Pressure difference: 250 atm.
   Temperature of the emulsion before the cooler: 34°C
   Temperature of the emulsion after the cooler: 33°C
   Pressure in the second liquid: 0.4 atm.

A margarine was prepared by a conventional method from the 84% fat emulsion obtained. It resembled the product obtained in Example 81.

EXAMPLE 102

The same procedure is followed as in Example 82, except for the following differences:
Preparation of emulsion
   A water-in-oil emulsion is prepared by injecting an aqueous phase into a fatty phase.
   Composition of the aqueous phase and additives as in Example 101.
   Composition of the fatty phase and additives as in Example 101.
   Flow rate of the fatty, second liquid: 600 l/h
   Pressure difference: 179 atm (1 nozzle: 0.4 mm diameter opening)
   After injection, the emulsion was cooled in the tubular cooler as in Example 101.
   Temperature before the cooler: 28°C
   Temperature after the cooler: 27°C
   Pressure in the second liquid: 0.4 atm The emulsion had a fat content of 79%. The margarine obtained from it by a conventional method resembled the product obtained in Example 81.

EXAMPLE 103 AND COMPARISONS H AND I

A coffee whitener with a fat content of about 1% was prepared as follows:
   Skimmed milk concentrated to a dry solids content of 23% was prepared from fresh skimmed milk in a falling stream evaporator. This concentrate was divided into 3 portions each of which was differently processed:
   a. Comparison H: 1,160 l of the condensed skim milk was blended with 40 l of fresh cream with a fat content of 30%. The blend was homogenised at 50°C under a pressure of 150 atm. Coagulation occurred.
   b. Comparison I: 1,160 l of the condensed skim milk was blended with stirring with 40 l of a homogenised cream having a fat content of 30% (homogenised at 50°C and 150 atm.) During stirring, both components had a temperature of about 5°C. The coffee whitener thus obtained had a dry solids content of 22.9%. The product was then pre-heated to 60°C while being stirred in the supply tank and then, while flowing through a plate heater, sterilised for 20 sec. at 130°C.

After being cooled to ambient temperature, a flaky precipitate could be observed.
   c. Example 103: 40 l of fresh cream having the same quality as in (a) was injected into 1,160 l of the condensed skim milk.

| Injection conditions: | |
|---|---|
| Temperature of milk (2nd liquid): | 5°C |
| Through-put of milk: | about 1,000 l/h |
| Cream (1st liquid) temperature: | 60°C |
| Pressure difference: | 300 atm |
| Pressure in second liquid: | 1.5 atm |
| Diameter of nozzle opening: | 0.314 mm |

The emulsion thus obtained was sterilised as in (b). A stable, keepable coffee whitener was obtained. Formation of flakes did not occur. In the Whitaker test flakes appeared only after a 0.15 n $CaCl_2$ solution (R. Whitaker, J. Dairy Science 14 (1931) 177).

EXAMPLE 104

The same procedure was followed as in Example 103, except that, before concentration in the falling stream evaporator, 0.0075% of $Na_2HPO_4$ (based on the starting milk) was added to the skimmed milk used as the starting product. The coffee whitener thus obtained had an even higher emulsion stability than the coffee whitener obtained according to Example 103, for in the Whitaker test there was still no appearance of flakes on the addition of a 0.3 n $CaCl_2$ solution.

EXAMPLE 105 a. Preparation of emulsion
   A water-in-oil emulsion was prepared by injecting an aqueous phase into a flowing fat composition.
Working conditions:
Composition of the aqueous, first liquid:
   25% of bacterially acidulated skim milk
   25% of water
   50% of skim milk
Additives: 2.4% of NaCl; 0.4% of sorbic acid (based on the aqueous phase)
   Temperature of the aqueous, second liquid: 16°C
   Composition of the fatty, first liquid: As Example 101

Additives: 0.3% of monoglyceride; 30 mg of cardin (?) per kg of fat; 0.005% of aroma cocktail (based on the fatty phase)
Flow rate of the fatty phase: 750 l/h
Temperature of the fatty, second liquid: 31°C
Pressure difference: 170 atm.
Diameter of the opening of the nozzle: 0.376 mm
Pressure in the second liquid: 0.3 atm.

b. Preparation of margarine

The emulsion was pumped into a "Kombinator" installation* with the aid of a reciprocating pump. Cooling was effected with sol of −8°C. As the capacity of the injection device had not been adjusted to the capacity of the "Kombinator" installation, excess emulsion flowed away through a by-pass fitted with a throttle valve.

* Manufacturer: Schroder & Co., Maschinenfabrik Lubeck, Type VUK

Pressure and temperature regulation in the "Kombinator" installation:

| $P_1$ | $P_2$ | $P_3$ | $P_4$ | $T_1$ | $T_2$ | $T_3$ | $T_4$ | $T_5$ | $T_6$ |
|---|---|---|---|---|---|---|---|---|---|
| (atm) | | | | (°C) | | | | | |
| 18 | 8 | 4 | 2 | 30 | 11 | 14 | 7 | 12 | 6.5 |

Number of revolutions of the coolers and the kneaders

| Cooler $K_1$ | Cooler $K_2$ | Cooler $K_3$ | Post-kneader |
|---|---|---|---|
| 350 r.p.m. | 350 r.p.m. | 350 r.p.m. | 75 r.p.m. |

The margarine through-put was about 30 kg/h. A dully glossy margarine of good spreadability was obtained. Free water could not be detected with the "Viso" Butter $H_2O$ indicator. The microscopic picture showed a fine and even crystal structure.

Test results:
| | |
|---|---|
| Water content: | 20% |
| Penetrometer-C value at 4°C: | 690 g/cm² |
| Penetrometer-C value at 20°C: | 300 g/cm² |

EXAMPLE 106

Using the condition described in Example 1 except that the skimmed milk flowed at 1000 l/h, 291 litres of an emulsion was obtained directly containing 3.1% of fat.

Cheese obtained from the emulsion as described in Example 1 had the same excellent properties.

EXAMPLE 107

For purposes of comparison, a Svecia cheese was made under the same conditions as described in Example 1 but with the difference that a refined maize germ oil (degree of acidity: 0.08; saponification value: 191.8; iodine value: 123; and linoleic acid content: 41.7%) was used to prepare the emulsion instead of the refined fat used in Example 1.

Cheese could be made from the emulsion but during the cheeseforming process it was noted that the syneresis of the curd particles was not very good, i.e., they stayed soft and did not have "body." After ripening for 8 weeks at a temperature of 13°C and a relative humidity of 80%, this cheese had a short, crumbly body and somewhat unpleasant rancid taste. Analysis of this cheese gave the following values:

| | |
|---|---|
| Dry matter: | 60.3% |
| Fat in dry matter: | 46.3% |
| pH: | 5.4 |
| NaCl content: | 1.9% |

EXAMPLE 108

An emulsion was made using the same conditions as in Example 1 but with freshly refined sunflowerseed oil (acid value: 0.06; saponification value: 190; iodine value: 134; and linoleic acid content: 63%) instead of maize germ oil. A Svecia cheese could be prepared from the emulsion obtained but the cheese displayed the same defects as the Svecia cheese made with maize germ oil (Example 107).

| | |
|---|---|
| Dry matter: | 61.2% |
| Fat in dry matter: | 46.8% |
| pH: | 5.4 |
| NaCl content: | 1.8% |

EXAMPLE 109

Using the conditions of Example 6 except that the skimmed milk flowed at 900 l/h a 3.0% fat emulsion was obtained directly.

Cheese obtained from this emulsion as described in Example 6 had the same excellent properties.

EXAMPLE 110

A 19% paraffin emulsion in methanol was obtained using the apparatus outlined in Example 1.

Conditions used:
| | |
|---|---|
| Flow rate of the methanol (second liquid): | 350 l/h |
| Pressure difference: | 170 atm. |
| Pressure in second liquid: | 0.3 atm. |
| Diameter of nozzle opening: | 0.376 mm |
| Temperature of methanol: | 23°C |
| Temperature of paraffin (first liquid): | 22°C |

The methanol contained 1.25% of a nonionic emulsifier.

TABLE I

| Example | Fat composition | Slip melting point (°C) | Linoleic acid content (%) | Iodine value |
|---|---|---|---|---|
| 9 | Triglycerides of $C_8-C_{10}$ fatty acids; 45% tricaprin; Ratio $C_8:C_{10}$ in range 25–5$C_8$:75–95$C_{10}$ | | | |
| 10 and 11 | 30% sunflower seed oil; 10% Coconut oil; 60% Interesterified Coconut oil and Palm oil | 32 | 25 | 79.5 |

TABLE I — Continued

| Example | Fat composition | Slip melting point (°C) | Linoleic acid content (%) | Iodine value |
|---|---|---|---|---|
| 12 | 78% sunflower seed oil; 22% Interesterified 50:50 sunflower seed oil and rapeseed oil (60)* | 48 | 50 | 120.0 |
| 13 | 78% sunflower seed oil; 22% Interesterified 50:50 sunflower seed oil and sunflower seed oil (60)* | 28 | 50 | 120.3 |
| 14 | Sunflower seed oil plus a partly interesterified mixture of sunflower seed oil (36)* and (42)* | 31 | 28 | 94.0 |
| 15 | 78% sunflower seed oil; 6% Coconut oil; 16% Interesterified 50:50 sunflower seed oil and sunflower seed oil (60)* | 22 | 50 | 118.0 |
| 16 | 78% sunflower seed oil; 22% Interesterified 50:50 sunflower seed oil and sunflower seed oil (60)* | 28 | 50 | 120.3 |
| 17 | Maize Germ oil | — | 52 | 123 |
| 18 | Interesterified 88.6:11.4 Maize germ oil and sunflower seed oil (69)* | 28.5 | 46 | 107.8 |
| 78 | 30:10:26:4:4:26 Coconut oil: groundnut oil (31)*:rapeseed oil (35)*:palm oil: palm oil (42)*: sunflower seed oil | | | |
| 94 | 64% Maize germ oil; 36% interesterified 70:30 Maize germ oil and palm oil (58)* | | | |

* Hardened to slip melting point (°C)

Table II

| Ex. | Fat Composition | Slip melting point °C | Linoleic acid content % | Iodine value | Special features Butter milk addition % | Curd treatment | process steps* Curd moulding | Addition of salt to curd | Partial salt bath treatment | emp. °C | Ripening Time Weeks |
|---|---|---|---|---|---|---|---|---|---|---|---|
| 19 | 87% Sunflower seed oil; 13% Interesterified 50:50 Palm oil (58)** and Palm kernel oil (59)** | 33 | ca. 50 | 118 | — | a | a | — | a | 13 | 8 |
| 20 | As Example 14 | 31 | 28 | 94 | — | a | a | — | a | 13 | 8 |
| 21 | 91% Sunflower seed oil; | 34 | ca. 57 | 128 | — | a | a | — | a | 13 | 8 |
| 22 | 9% Interesterified 50:50 | 34 | ca. 57 | 128 | 5 | a | a | — | a | 13 | 8 |
| 23 | Sunflower seed oil | 34 | ca. 57 | 128 | 5 | b | b | b | — | 13 | 2 |
| 24 | and Rapeseed oil (60)** | 34 | ca. 57 | 128 | 5 | b | a | — | a | 13 | 8 |
| 25 | As Example A | 33 | ca. 50 | 118 | — | b | a | — | a | 16 | 4 |
| 26 | 45% Sunflower seed oil; 30% Soyabean oil (33)** | 32,5 | ca. 28 | — | — | b | a | — | a | 16 | 4 |
| 27 | 25% Cottonseed oil (37)** | 32,5 | ca. 28 | — | — | b | a | — | a | 16 | 4 |

*) a = Air; b = Nitrogen
**) Hardened to slip melting point (°C)

TABLE III

| Polyunsaturated fat | kg | High melting fat (°C)* | kg | Slip melting point (°C) Before interesterification | After interesterification |
|---|---|---|---|---|---|
| Freshly refined sunflower seed oil | 20.0 | Rapeseed oil (60) | 20.0 | 58 | 52 |
| Freshly refined sunflower seed oil | 20.0 | Sunflower seed oil (60) | 20.0 | 52 | 45 |
| Freshly refined sunflower seed oil | 15.0 | Rapeseed oil (60) | 10.0 | 60 | 45 |

TABLE III – Continued

| Polyunsaturated fat | kg | High melting fat (°C)* | kg | Slip melting point (°C) Before interesterification | Slip melting point (°C) After interesterification |
|---|---|---|---|---|---|
| Freshly refined sunflower seed oil | 80.0 | Rapeseed oil (60) | 20.0 | 57 | 28.0 |
| Maize germ oil | 88.6 | Sunflower seed oil (69) | 11.4 | 60 | 28.5 |

*) Hardened to slip melting point given

Table IV

| Example | $d_1$ mm | Flow rate of second liquid l/h | Content of First liquid in emulsion % (a) | First liquid obtained % (b) |
|---|---|---|---|---|
| 32 | | 700 | 4.3 | — |
| 33 | | 600 | 4.9 | — |
| 34 | | 500 | 6.0 | — |
| 35 | 0.314 | 400 | 7.5 | — |
| 36 | | 300 | 10.5 | — |
| 37 | | 200 | 15.0 | — |
| 38 | | 100 | 25.0 | — |
| (a) 39 / (b) 52 | | 700 | 7.1 | 6.8 |
| 40 / 53 | | 600 | 9.0 | 8.9 |
| 41 / 54 | 0.376 | 500 | 11.0 | 10.5 |
| 42 / 55 | | 400 | 13.0 | 12.5 |
| 43 / 56 | | 300 | 16.2 | 16.0 |
| 44 / 57 | | 200 | 21.5 | 23.0 |
| 45 | | 100 | 32.5 | — |
| 46 / 58 | | 700 | 11.5 | 11.5 |
| 47 / 59 | | 600 | 13.0 | 13.0 |
| 48 / 60 | | 500 | 15.0 | 15.5 |
| 49 / 61 | 0.400 | 400 | 19.0 | 19.0 |
| 50 / 62 | | 300 | 21.5 | 24.0 |
| 51 / 63 | | 200 | 30.5 | 36.0 |
| 52 | | 100 | 41.0 | — |

(a) First liquid was injected in same direction as flow of second liquid (counter-current).
(b) First liquid was injected against flow of second liquid (counter-current).

TABLE V

| | Conditions for Preparation of Emulsion | | | | | | Properties of Emulsion (3.5%) | | | | | | |
|---|---|---|---|---|---|---|---|---|---|---|---|---|---|
| | Fat (first liquid) | | | Emulsifier | Second liquid °C | Fat content of emulsion % | Creaming Fat content of 75 ml from lower fraction (U) % | Creaming Fat content in 25 ml of upper fraction (V) % | Emulsification Efficiency 100 U/V:100 % | | Curd Solidity % | Curd Yield of whey ml | Whey Fat content % | Whey Appearance |
| Ex. | atm | °C | $d_1$ mm | | | | | | | | | | | |
| 64 | 200 | 100 | 0.376 | — | 45 | — | 3.25 | 3.65 | 11.5 | 19.4 | 40 | 1380 | 0.15 | |
| 65 | 200 | 90 | 0.376 | — | do. | — | 3.23 | 3.66 | 11.8 | 20.6 | 30 | 1320 | 0.25 | a little cloudy |
| 66 | 200 | 80 | 0.376 | — | do. | — | 3.45 | 3.70 | 6.5 | 22.8 | 35 | 1370 | 0.20 | do. |
| 67 | 200 | 70 | 0.376 | — | do. | — | 3.45 | 3.70 | 6.5 | 25.7 | 30 | 1360 | 0.20 | do. |
| 68 | 200 | 60 | 0.376 | — | do. | — | 3.40 | 3.75 | 9.5 | 25.4 | 30 | 1370 | 0.25 | do. |
| 69 | 200 | 50 | 0.376 | — | do. | — | 3.40 | 3.77 | 9.8 | 23.9 | 35 | 1340 | 0.20 | do. |
| 70 | 200 | 40 | 0.376 | — | do. | — | 3.37 | 3.75 | 10.0 | 21.1 | 35 | 1360 | 0.20 | do. |
| 71 | 50 | 70 | 0.376 | — | do. | 4.8 | 3.25 | 3.65 | 11.0 | 12.9 | 40 | 1280 | 0.20 | do. |
| 72 | 100 | 70 | 0.376 | — | do. | 7.0 | 3.35 | 3.70 | 9.5 | 18.7 | — | — | — | do. |
| 73 | 150 | 70 | 0.376 | — | do. | 9.0 | 3.40 | 3.70 | 8.0 | 22.5 | 40 | 1300 | 0.15 | do. |
| 74 | 250 | 70 | 0.376 | — | do. | 12.0 | 3.45 | 3.55 | 2.8 | 25.7 | 45 | 1310 | 0.10 | do. |
| 75 | 200 | 70 | 0.376 | — | 20 | — | 3.25 | 3.65 | 11.5 | 12.9 | 35 | 1320 | 0.15 | do. |
| 76 | 200 | 70 | 0.376 | — | 45 | — | 3.40 | 3.60 | 5.5 | 29.6 | 35 | 1380 | 0.20 | do. |
| 77* | 200 | 70 | 0.376 | lyso-cetinol | do. | — | 3.45 | 3.55 | 2.6 | 25.7 | 30 | 1320 | 0.20 | do. |
| Milk | | | | | | | 2.50 | 5.90 | 57.5 | 14.5 | 30 | 1390 | 0.25 | cloudy |

*Emulsion containing 30% fat injected.

TABLE VI

| Fat | Slip melting point °C. | linoleic acid content % | Iodine value |
|---|---|---|---|
| 91% of sunflower seed oil 9% interesterified 50:50 sunflower seed oil and rapeseed oil (60)* | 34 | 57 | 128 |
| 75% sunflower seed oil; 25% interesterified 60:40 sunflower seed oil and rapeseed oil (60)* | 32 | 50 | |
| Interesterified 80:20 sunflower seed oil and rapeseed oil (60)* | 28 | 48 | 105.5 |
| Interesterified 88.6:11.4 maize germ oil and sunflower seed oil (69)* | 28.5 | 46 | 107.8 |

*) hardened to slip melting point (°C)

We claim:

1. A process for preparing an aqueous fatty emulsion in which a first liquid is injected through a nozzle into a stream of a second liquid flowing at between about 2 and about 50 cms/sec per nozzle through and filling a pipe with, immediately before injection, a pressure difference between said first and said second liquid of at least 100 atmospheres and a pressure in said second liquid of at least 0.3 atmospheres, said first and second liquids consisting essentially of a fatty and an aqueous phase.

2. A process for preparing an aqueous fatty emulsion according to claim 1, in which there is a multiplicity of nozzles in series.

3. A process for preparing an aqueous fatty emulsion according to claim 1, in which the injection conditions are not the same for every nozzle.

4. A process for preparing a margarine by working an aqueous fatty emulsion prepared according to claim 3.

5. A process according to claim 2, in which the distance between successive nozzles is at least 20 times the diameter of the pipe.

6. A process according to claim 1, in which said second liquid is a milk-based aqueous phase.

7. A cheese prepared from an emulsion with an emulsification efficiency in the range 15 to 30 prepared by a process according to claim 6.

8. A cheese as claimed in claim 7 in which said first liquid is a fat at a temperature in the range about 50°C to about 90°C and the second liquid is at a temperature in the range about 20°C to about 60°C.

9. A cheese as claimed in claim 8 in which the fat is a vegetable fat with a slip-melting point in the range about 24°C to about 37°C and comprising an interesterified blend of a polyunsaturated fat and a high-melting fat with a slip-melting point in the range about 50°C to about 70°C.

10. A cheese as claimed in claim 8 in which the fat is a vegetable fat with dilatations $D_0$ of 50 to 400, $D_{10}$ if 40 to 350, $D_{20}$ of 25 to 220, $D_{30}$ of 10 to 135 and $D_{40}$ of 2 to 50.

11. A cheese containing a vegetable fat with a slip-melting point in the range 24°C to 37°C and comprising an interesterified blend of a polyunsaturated fat and a high-melting fat with a slip-melting point in the range 50°C to 70°C and prepared by a process according to claim 6.

12. A cheese according to claim 11, in which the vegetable fat consists essentially of the interesterified blend or a mixture of the interesterified blend and a polyunsaturated fat.

13. A cheese according to claim 12, in which the vegetable fat has dilatations $D_0$ of 50 to 400, $D_{10}$ of 40 to 350, $D_{20}$ of 25 to 220, $D_{30}$ of 10 to 135 and $D_{40}$ of 2 to 50.

* * * * *

UNITED STATES PATENT OFFICE
CERTIFICATE OF CORRECTION

PATENT NO. : 3,889,004
DATED : June 10, 1975
INVENTOR(S) : Heinrich Gottlieb Schmidt, Kunc Gustav Strauss and Josef Tennikat It is certified that error appears in the above-identified patent and that said Letters Patent are hereby corrected as shown below:

| | |
|---|---|
| Column 2, line 61, | "tthe" should read --the--. |
| Column 3, line 8, | "µlµ" should read --µ--. |
| Column 4, line 22, | delete "1/h". |
| Column 6, line 50, | replace "1/h" by --Examples of--. |
| Column 7, line 7, | replace "and" by --an--. |
| Column 7, line 23, | replace "convention" by --conventional--. |
| Column 10, line 1, | replace "cream" by --creams--. |
| Column 14, line 55, | "degatted" should read -defatted--. |
| Column 16, line 2, | "quantiry" should read --quantity--. |
| Column 16, line 14, | after the word "about" insert the words --20 hours under a pressure of about--. |
| Column 16, line 15, | after the word "at" delete "20 hours under a pressure of about 40 kg//" and replace it by --a temperature of--. |
| Column 16, line 39, | replace "400" by --400 1--. |
| Column 17, line 65, | after the word "of" insert --$\geq$--. |
| Column 18, line 11, | after the word "of" insert --$\geq$--. |
| Column 19, line 40, | replace "28, 28" by --28, 29--. |
| Column 25, line 42, | replace "sterlised" by --sterilised--. |
| Column 27, line 37, | replace "D" by --I)--. |
| Column 33, line 2, | "(?)" should be deleted. |
| Column 34, Table I, | line 63, insert after the ";" and before the number "45" the symbol --$\geq$--. |
| Column 37, Table IV, | add a horizontal line over the width of the table under Example 38 and one under Example 45. |
| Column 37, line 36, | under footnote (a); "counter current" should read --cocurrent--. |

Signed and Sealed this sixth Day of January 1976

[SEAL]

Attest:

RUTH C. MASON
Attesting Officer

C. MARSHALL DANN
Commissioner of Patents and Trademarks